(12) United States Patent
Yan et al.

(10) Patent No.: US 12,688,704 B2
(45) Date of Patent: Jul. 21, 2026

(54) IMPLEMENTING AUTONOMOUS VEHICLE LANE UNDERSTANDING SYSTEMS USING FILTER-BASED LANE TRACKING

(71) Applicant: Waymo LLC, Mountain View, CA (US)

(72) Inventors: Hang Yan, Sunnyvale, CA (US); Zhengyu Zhang, San Jose, CA (US); Yan Wang, Sunnyvale, CA (US); Jingxiao Zheng, San Jose, CA (US); Dmitry Kalenichenko, Marina Del Ray, CA (US); Vasiliy Igorevich Karasev, San Francisco, CA (US); Alper Ayvaci, San Jose, CA (US); Xu Chen, Livermore, CA (US)

(73) Assignee: Waymo LLC, Mountain View, CA (US)

( * ) Notice: Subject to any disclaimer, the term of this patent is extended or adjusted under 35 U.S.C. 154(b) by 244 days.

(21) Appl. No.: 18/242,928

(22) Filed: Sep. 6, 2023

(65) Prior Publication Data

US 2025/0078531 A1 Mar. 6, 2025

(51) Int. Cl.
  *G06V 20/56* (2022.01)
  *B60W 60/00* (2020.01)
  (Continued)

(52) U.S. Cl.
  CPC ......... *G06V 20/588* (2022.01); *B60W 60/001* (2020.02); *G01S 13/89* (2013.01);
  (Continued)

(58) Field of Classification Search
  CPC .... G06V 20/588; G06V 10/764; G06V 10/80; G06V 10/82; G06V 10/25; G06V 10/803;
  (Continued)

(56) References Cited

U.S. PATENT DOCUMENTS

| 2009/0067675 A1 | 3/2009 | Tan et al. |
| 2013/0141520 A1 | 6/2013 | Zhang et al. |
| | (Continued) | |

FOREIGN PATENT DOCUMENTS

| EP | 2602744 A1 | 6/2013 |
| WO | 2023158642 A1 | 8/2023 |

OTHER PUBLICATIONS

Extended European Search Report for European Application No. 24195786.9, mailed Jan. 29, 2025, 8 Pages.

*Primary Examiner* — Resha Desai
*Assistant Examiner* — Naomi M Wolford
(74) *Attorney, Agent, or Firm* — Lowenstein Sandler LLP

(57) ABSTRACT

A method includes obtaining, by a processing device, input data derived from a set of sensors of an autonomous vehicle (AV), generating, by the processing device using a set of lane detection classifier heads, at least one heatmap based on a fused bird's eye view (BEV) feature generated from the input data, obtaining, by the processing device, a set of polylines using the at least one heatmap, wherein each polyline of the set of polylines corresponds to a respective track of a first set of tracks for a first frame, and generating, by the processing device, a second set of tracks for a second frame after the first frame by using a statistical filter based on a set of extrapolated tracks for the second frame and a set of track measurements for the second frame, wherein each track measurement of the set of track measurements corresponds to a respective updated polyline obtained for the second frame.

20 Claims, 17 Drawing Sheets

(51) Int. Cl.
     *G01S 13/89*        (2006.01)
     *G06V 10/764*     (2022.01)
     *G06V 10/80*       (2022.01)

(52) U.S. Cl.
     CPC ............ *G06V 10/764* (2022.01); *G06V 10/80*
          (2022.01); *B60W 2420/408* (2024.01); *B60W 2552/53* (2020.02)

(58) Field of Classification Search
     CPC ......... B60W 60/001; B60W 2420/408; B60W 2552/53; B60W 40/06; B60W 50/00; B60W 2050/0005; B60W 2050/0052; B60W 2552/23; B60W 30/12; B60W 2420/403; G01S 13/89; G01S 13/931; G01S 13/867; G01S 2013/93271; G01S 13/60; B60R 2300/804; B60R 2300/301; B62D 1/28; G06T 2207/30256; G06T 7/70; G06T 7/73; G06T 2207/10028; G06T 2207/10044; G06T 7/277; G06T 2219/004; G06T 2207/30241; G06T 7/77; G06T 2207/20081; G06T 2207/20076; G06T 2207/20084; G01C 21/3602; G06F 18/25
     See application file for complete search history.

(56)                References Cited

U.S. PATENT DOCUMENTS

2020/0341466 A1 * 10/2020 Pham ..................... G06N 3/045
2024/0239368 A1 * 7/2024 Du Toit ............. B60W 60/001

* cited by examiner

600E

680

600D

670

660

650

630

610

1200

1240

START

Obtain a set of tracks for a first frame 1242

Generate a set of track predictions for a second frame after the first frame 1244

Obtain a set of track measurements for the second frame 1246

Generate a set of updated track measurements for the second frame based on the set of track predictions and the set of track measurements 1248

END

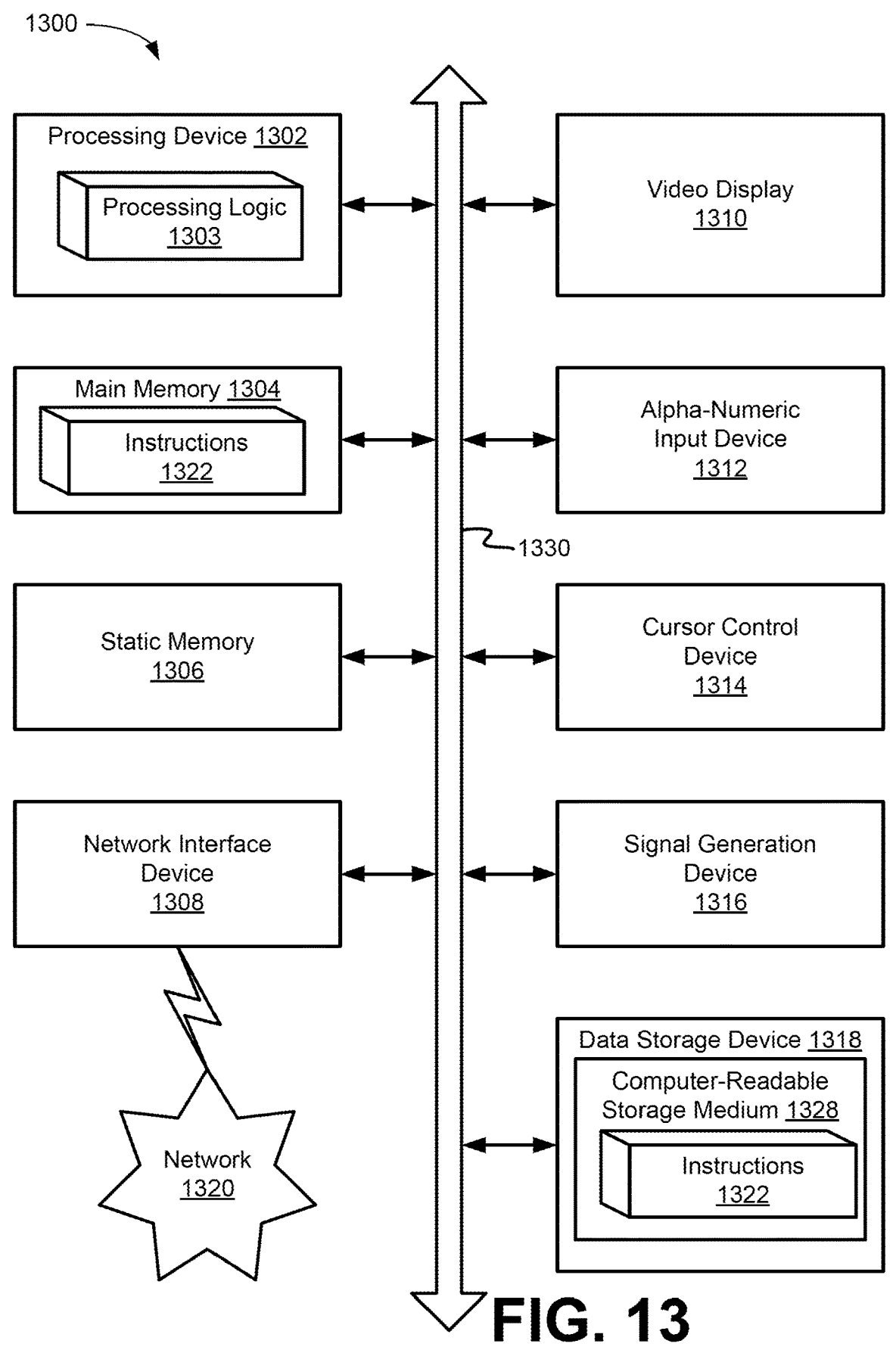

1300

Processing Device 1302

Processing Logic
1303

Main Memory 1304

Instructions
1322

1330

Static Memory
1306

Network Interface
Device
1308

Network
1320

Video Display
1310

Alpha-Numeric
Input Device
1312

Cursor Control
Device
1314

Signal Generation
Device
1316

Data Storage Device 1318

Computer-Readable
Storage Medium 1328

Instructions
1322

FIG. 13

IMPLEMENTING AUTONOMOUS VEHICLE LANE UNDERSTANDING SYSTEMS USING FILTER-BASED LANE TRACKING

TECHNICAL FIELD

The instant specification generally relates to systems and applications that detect and classify objects and, in particular, to autonomous vehicles and vehicles deploying advanced driver-assistance system (ADAS) technology. More specifically, the instant specification relates to implementing autonomous vehicle (AV) lane understanding systems using filter-based lane tracking.

BACKGROUND

An autonomous vehicle (AV) (fully or partially self-driving) operates by sensing an outside environment with various electromagnetic (e.g., radar and optical) and non-electromagnetic (e.g., audio and humidity) sensors. Some AVs chart a driving path through the environment based on the sensed data. The driving path can be determined based on Global Navigation Satellite System (GNSS) data and road map data. While the GNSS and the road map data can provide information about static aspects of the environment (buildings, street layouts, road closures, etc.), dynamic information (such as information about other vehicles, pedestrians, streetlights, etc.) is obtained from contemporaneously collected sensing data. Precision and safety of the driving path and of the speed regime selected by an AV depend on timely and accurate identification of various objects present in the driving environment and on the ability of a driving algorithm to process the information about the environment and to provide correct instructions to the AV controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which:

FIG. 13 depicts a block diagram of an example computing device capable of implementing autonomous vehicle (AV) lane understanding systems using filter-based lane tracking, in accordance with some implementations of the present disclosure.

SUMMARY

Figure 1:
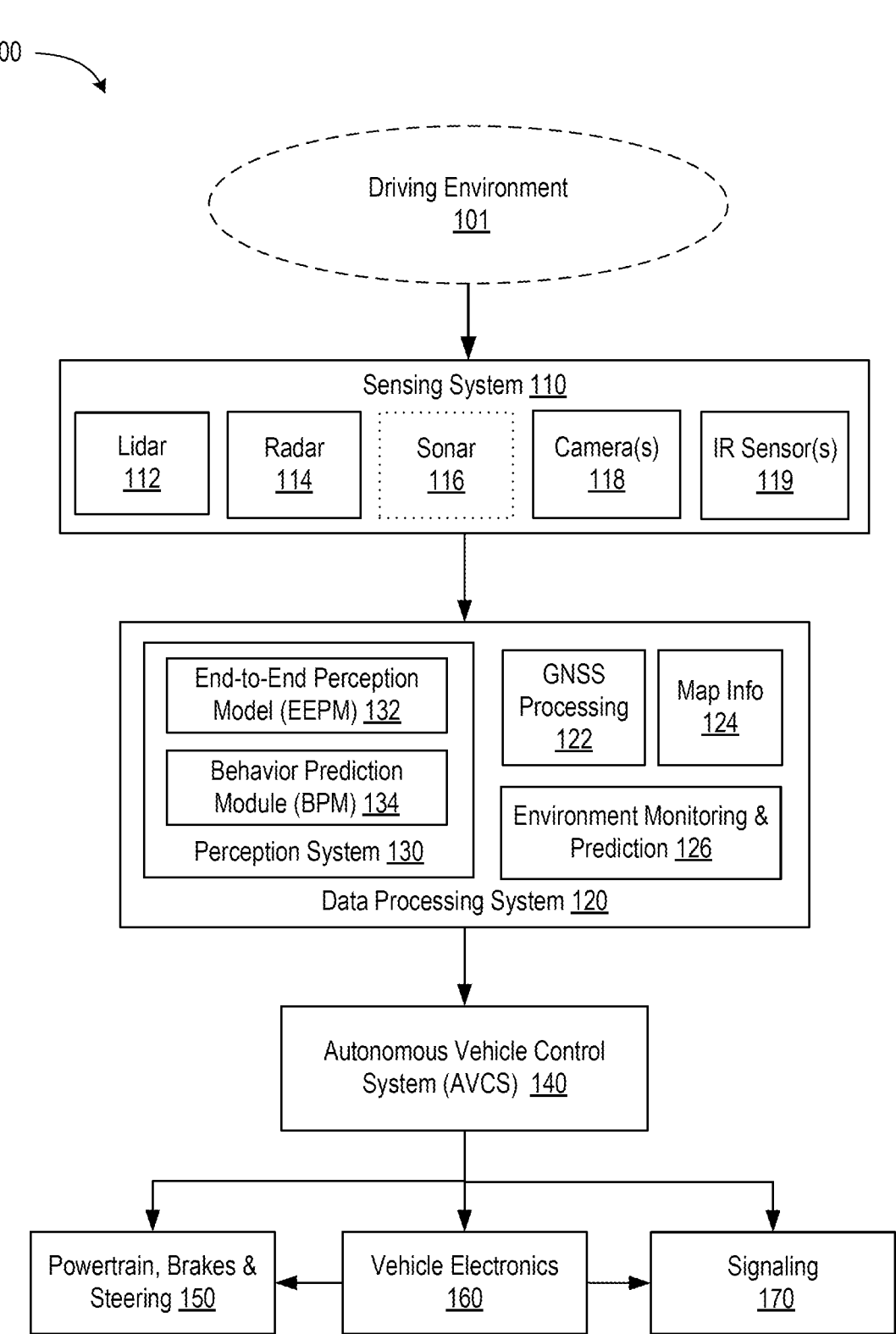
FIG. 1 is a diagram of components of an example autonomous vehicle (AV), in accordance with some implementations of the present disclosure.

In one implementation, disclosed is a method that includes obtaining, by a processing device, input data derived from a set of sensors of an autonomous vehicle (AV), generating, by the processing device using a set of lane detection classifier heads, at least one heatmap based on a fused bird's eye view (BEV) feature generated from the input data, obtaining, by the processing device, a set of polylines using the at least one heatmap, wherein each polyline of the set of polylines corresponds to a respective track of a first set of tracks for a first frame, and generating, by the processing device, a second set of tracks for a second frame after the first frame by using a statistical filter based on a set of extrapolated tracks for the second frame and a set of track measurements for the second frame, wherein each track measurement of the set of track measurements corresponds to a respective updated polyline obtained for the second frame.

In another implementation, disclosed is a system that includes a memory and a processing device, operatively coupled to the memory, configured to obtain input data derived from a set of sensors of an autonomous vehicle (AV), generate, using a set of lane detection classifier heads, at least one heatmap based on a fused bird's eye view (BEV)

feature generated from the input data, obtain a set of polylines using the at least one heatmap, wherein each polyline of the set of polylines corresponds to a respective track of a first set of tracks for a first frame, and generate a second set of tracks for a second frame after the first frame by using a statistical filter based on a set of extrapolated tracks for the second frame and a set of track measurements for the second frame, wherein each track measurement of the set of track measurements corresponds to a respective updated polyline obtained for the second frame.

In yet another implementation, disclosed is a non-transitory computer-readable storage medium having instructions stored thereon that, when executed by a processing device, cause the processing device to perform operations including obtaining input data derived from a set of sensors of an autonomous vehicle (AV), generating, using a set of lane detection classifier heads, at least one heatmap based on a fused bird's eye view (BEV) feature generated from the input data, obtaining a set of polylines using the at least one heatmap, wherein each polyline of the set of polylines corresponds to a respective track of a first set of tracks for a first frame, and generating a second set of tracks for a second frame after the first frame by using a statistical filter based on a set of extrapolated tracks for the second frame and a set of track measurements for the second frame, wherein each track measurement of the set of track measurements corresponds to a respective updated polyline obtained for the second frame.

DETAILED DESCRIPTION

Although various implementations can be described below, for the sake of illustration, using autonomous vehicle (AV) driving systems and driver assistance systems as examples, it should be understood that the techniques and systems described herein can be used for a wide range of applications, including aeronautics, marine applications, traffic control, animal control, industrial and academic research, public and personal safety, etc.

For improving safety of AV driving operations, AVs can deploy techniques of fast and accurate detection, classification, and tracking of various objects encountered on or near roadways, such as lane markings and curbs, road obstacles, construction equipment, roadside structures, and the like. An AV (as well as various driver assistance systems) can use a number of sensors to facilitate detection of objects in a driving environment and determine the motion of such objects. The sensors typically include radio detection and ranging sensors (radars), light detection and ranging sensors (lidars), digital cameras of multiple types, sonars, positional sensors, and the like. Different types of sensors provide different and often complementary benefits. For example, radars and lidars emit electromagnetic signals (radio signals or optical signals) that reflect from the objects and carry information allowing to determine distances to the objects (e.g., from the time of flight of the signals) and velocities of the objects (e.g., from the Doppler shift of the frequencies of the signals). Radars and lidars can cover an entire 360-degree view, e.g., by using a scanning transmitter of sensing beams. Sensing beams can cause numerous reflections covering the driving environment in a dense grid of return points. Each return point can be associated with the distance to the corresponding reflecting object and a radial velocity (a component of the velocity along the line of sight) of the reflecting object.

Some systems and methods of object identification and tracking use various sensing modalities, such as lidars, radars, cameras, etc., to obtain images of the environment. The images can then be processed by trained machine learning models to identify locations of various objects in the images (e.g., in the form of bounding boxes), state of motion of the objects (e.g., speed, as detected by lidar or radar Doppler effect-based sensors), object types (e.g., a vehicle or pedestrian), and so on. Motion of objects (or any other evolution, such as splitting of a single object into multiple objects) can be predicted by creating and maintaining tracks associated with a particular object.

Using multiple sensing modalities (e.g., lidars, radars, cameras) to obtain often complementary data improves precision of object detection, identification, and tracking but comes at a substantial cost in sensing hardware and processing software. For example, a lidar sensor can provide valuable information about distances to various reflecting surfaces in the outside environment. A lidar sensor, however, is an expensive optical and electronic device that operates by actively probing the outside environment with optical signals and requires considerable maintenance and periodic calibration. Lidar returns (the point cloud) have to be processed, segmented into groups associated with separate hypothesized objects, and matched with objects detected using other sensing modalities (e.g., cameras), which requires additional processing and memory resources. Cameras, on the other hand, operate by passively collecting light (and/or infrared electromagnetic waves) emitted (or reflected) by objects of the environment and are significantly simpler and cheaper in design, installation, and operations. Consequently, various driver assistance systems that do not deploy lidars (for costs and maintenance reasons) are typically equipped with one or more cameras. Cameras can also be more easily installed at various stationary locations and used for traffic monitoring and control, public and private safety applications, and the like. Being based on optical or infrared imaging technology, cameras have certain advantages over radars, which, while allowing detection of distances to (and velocities of) objects, operate in a range of wavelengths that has intrinsically lower resolution compared with cameras.

Cameras, however, produce projections of a three-dimensional (3D) outside environment onto a two-dimensional imaging surface (e.g., an array of camera's light detectors), which may be a plane or a curved surface. This gives rise to two related challenges. On one hand, distances to objects (often referred to depths of the objects in the image) are not immediately known (though can often be determined from the context of the imaged objects). On the other hand, camera images have perspective distortions causing the same number of pixels separating images of objects to correspond to different distances between objects depending on the depths of the objects. Additionally, objects whose depictions are proximate to each other can nonetheless be separated by a significant distance (e.g., a car and a pedestrian visible behind the car). Machine learning techniques of object detection sometimes attempt to map objects from the perspective view to the top-down view, also known as the bird's-eye view (BEV), in which objects are represented on a convenient manifold, e.g., a plane viewed from above and characterized by a simple set of Cartesian coordinates. Object identification and tracking can subsequently be performed directly within the BEV representation. However, some techniques that provide mappings of the objects to the BEV representation and estimates of distances to various objects often have a low accuracy, causing misplacement of the objects within the BEV representation, which can result not only in an error in ascertaining a distance to a road user, but may also lead to a loss of important contextual information.

Aspects and implementations of the present disclosure address these and other challenges by enabling methods and systems that can implement AV lane understanding systems using filter-based lane tracking. An AV lane understanding system described herein can include an end-to-end (E2E) perception system that utilizes an end-to-end perception model (EEPM). An EEPM is a machine learning model that can include a set of neural networks and is trained to determine how an AV should perceive a driving environment and how the AV should react to the driving environment. Depending on computational complexity and sophistication of training, an EEPM can be used in various levels of driving automation, including Level 2 driving assistance systems (L2 systems), Level 3 contextual autonomous driving systems (L3 systems), Level 4 predominantly autonomous driving systems (L4 systems), Level 5 fully autonomous driving systems (L5 systems), etc. An EEPM can be trained using sensor dropout scenarios, in which some of the sensors are removed or non-operational (e.g., at least one camera and/or at least one radar), which may happen in real life. For example, a right-side facing camera can be removed and the information about the objects in the portion of space covered by the right-side facing camera can be provided by other sensing modalities (e.g., lidar and/or radar sensors). Training scenarios can also include a complete dropout of a particular sensing modality, e.g., dropout of lidar data feed, such that all information about the environment is provided by cameras and radars. Accordingly, an EEPM can be trained to generate predictions that are robust against failure of individual sensors and entire sensing modalities.

In particular, implementations described herein can be used to train an EEPM to generate a prediction using input data derived from a set of sensors of an AV. In some implementations, an EEPM can be trained to perform detection and tracking of lanes within a driving environment. Illustratively, performing lane detection and tracking can include detecting lane markers, curbs, etc. on roads, such as highways, freeways, expressways, city streets, local roads, etc.

Lane detection using an EEPM can use input data obtained from sensors of an AV (e.g., cameras, lidars, radars, etc.) and depicting an outside environment. The input data can be used to generate a heatmap indicating a likelihood of presence of various objects within a bird's eye view (BEV) image of the environment. The EEPM (which can include a generative model) can process the heatmap to obtain a set of polylines within the BEV image. Each polyline can correspond to a respective lane, or track, observed at a first time. Additional BEV images, similarly obtained and processed for subsequent times, can provide additional sets of polylines which are representative of changes in the visible, to the AV, layout of driving lanes as the AV is traveling on the roadway.

Tracking visible lane changes using an EEPM can be made more accurate by deploying a suitable statistical filter ("filter"). The term "statistical filter" or "filter" as used herein, refers to any optimal estimator that can recursively estimate a state of a system (e.g., visible lane layout of a driving environment) based on a combination of lane or track measurements (which can be noisy) and lane or track predictions (which can be imprecise). A filter can improve accuracy of predictions-if both track predictions and track measurements are available-beyond the individual accuracy of the track prediction model and the accuracy of the track measurements. Examples of filters include (but are not limited to) Kalman filters, extended Kalman filters, adaptive Kalman filters, particle filters, etc. For example, a Kalman filter can be a one-dimensional (1D) Kalman filter.

More specifically, a suitable evolution model (e.g., linear evolution model) can specify how a lane evolves with time as a result of a changing field of the BEV caused by AV motion, e.g., by defining (and tracking) velocities of various visible portions of the lane(s). For example, when the AV moves from a right lane to a left lane on a roadway, the visible lane boundaries shift to the right. The rate of this shift depends on the speed of the AV's maneuver, e.g., the faster the lane change occurs the higher the visible lane velocity, relative to the AV, is going to be. Based on the previously observed rate of lane changes and the current geometry of a lane at a first time, the model can predict where the lane is likely to be at a later, second time. This prediction can be verified by repeating the above operations (collecting new sensor input data, processing the input data by the EEPM to obtain a new set of polylines, and/or the like), which is referred to as a measurement. As part of statistical filter techniques, the lanes measured at the second time are not yet accepted (because of the presence of measurement noise/errors) for the actual layout of the lanes at the second time. Instead, each measured lane is combined (e.g., fused) with a corresponding predicted lane in a manner determined by the evolution model. For example, each measured lane can be combined with a corresponding predicted lane by taking a weighted average of the measured lane and the predicted lane. Weights in the weighted average are determined by a gain parameter that accounts for the noise in the measurements and inaccuracies of predictions. The error statistics of measurements/predictions can also be tracked and updated after each recursive step. Each combined lane is then assumed to be an actual lane at the second time. Based on how the lanes have changed between the first time and the second time, the evolution model that predicts future lane changes can then be updated (e.g., by adjusting the velocities of visible portions of the lanes), the predictions can be made for a subsequent time, and another iteration of the statistical filter can be performed. Further details regarding implementing AV lane understanding systems using filter-based lane tracking, including performing lane detection and lane tracking, will now be described below with reference to FIGS. 1-13.

Advantages of the described implementations include (but are not limited to) fast and accurate detection, identification, and tracking of objects in a way that avoids large computational overheads of processing of data of multiple sensing modalities. Since the machine learning models trained and deployed as disclosed herein are capable of efficient object detection based on input data (e.g., camera data and radar data), EEPMs described herein can be deployed on a variety of platforms (e.g., AVs) including systems with modest computational resources.

FIG. 1 is a diagram illustrating components of an example autonomous vehicle (AV) 100, in accordance with some implementations of the present disclosure. Autonomous vehicles can include motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), spacecraft (controllable objects operating outside Earth atmosphere) or any other self-propelled vehicles (e.g., robots, factory or warehouse robotic vehicles, sidewalk delivery robotic vehicles, etc.) capable of being operated in a self-driving mode (without a human input or with a reduced human input).

Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

As described herein, in a semi-autonomous or partially autonomous driving mode, even though the vehicle assists with one or more driving operations (e.g., steering, braking and/or accelerating to perform lane centering, adaptive cruise control, advanced driver assistance systems (ADAS), or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods may be described below in conjunction with autonomous vehicles, similar techniques can be used in various driver assistance systems that do not rise to the level of fully autonomous driving systems. In the United States, the Society of Automotive Engineers (SAE) have defined different levels of automated driving operations to indicate how much, or how little, a vehicle controls the driving, although different organizations, in the United States or in other countries, may categorize the levels differently. More specifically, disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such driving assistance systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

A driving environment 101 can include any objects (animate or inanimate) located outside the AV, such as roadways, buildings, trees, bushes, sidewalks, bridges, mountains, other vehicles, pedestrians, piers, banks, landing strips, animals, birds, and so on. The driving environment 101 can be urban, suburban, rural, and so on. In some implementations, the driving environment 101 can be an off-road environment (e.g., farming or other agricultural land). In some implementations, the driving environment 101 can be an indoor environment, e.g., the environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment 101 can be three-dimensional and can include objects that are capable of moving along all three directions (e.g., balloons, falling leaves, etc.). Hereinafter, the term "driving environment" should be understood to include all environments in which an autonomous motion (e.g., SAE Level 5 and SAE Level 4 systems), conditional autonomous motion (e.g., SAE Level 3 systems), and/or motion of vehicles equipped with driver assistance technology (e.g., SAE Level 2 systems) can occur. Additionally, "driving environment" can include any possible flying environment of an aircraft (or spacecraft) or a marine environment of a naval vessel. The objects of the driving environment 101 can be located at any distance from the AV, from close distances of several feet (or less) to several miles (or more).

The example AV 100 can include a sensing system 110. The sensing system 110 can include various electromagnetic (e.g., optical, infrared, radio wave, etc.) and non-electromagnetic (e.g., acoustic) sensing subsystems and/or devices. The sensing system 110 can include one or more lidars 112, which can be a laser-based unit capable of determining distances to the objects and velocities of the objects in the driving environment 101. In some implementations, the sensing system 110 includes zero lidars. The sensing system 110 can include one or more radars 114, which can be any system that utilizes radio or microwave frequency signals to sense objects within the driving environment 101 of the AV 100. The lidar(s) 112 and or radar(s) 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. Each of the lidar(s) 112 and radar(s) 114 can include a coherent sensor, such as a frequency-modulated continuous-wave (FMCW) lidar or radar sensor. For example, lidar(s) 112 and/or radar(s) 114 can use heterodyne detection for velocity determination. In some implementations, the functionality of a time-of-flight (ToF) sensor and coherent lidar (or radar) is combined into a lidar (or radar) unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple lidars 112 and/or radar 114s can be mounted on AV 100.

Lidar 112 (and/or radar 114) can include one or more optical sources (and/or radio/microwave sources) producing and emitting signals and one or more detectors of the signals reflected back from the objects. In some implementations, lidar 112 and/or radar 114 can perform a 360-degree scanning in a horizontal direction. In some implementations, lidar 112 and/or radar 114 can be capable of spatial scanning along both the horizontal and vertical directions. In some implementations, the field of view can be up to 60 degrees in the vertical direction (e.g., with at least a part of the region above the horizon being scanned with lidar or radar signals).

In some implementations (e.g., aerospace applications), the field of view can be a full sphere (consisting of two hemispheres).

The sensing system 110 can further include one or more cameras 118 to capture images of the driving environment 101. Cameras 118 can operate in the visible part of the electromagnetic spectrum, e.g., 300-800 nm range of wavelengths (herein also referred for brevity as the optical range). Some of the optical range cameras 118 can use a global shutter while other cameras 118 can use a rolling shutter. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can also include one or more sonars 116, for active sound probing of the driving environment 101, e.g., ultrasonic sonars, and one or more microphones for passive listening to the sounds of the driving environment 101. The sensing system 110 can also include one or more infrared range (IR) sensors 119. For example, IR sensor(s) 119 can include an IR camera. IR sensor(s) 119 can use focusing optics (e.g., made of germanium-based materials, silicon-based materials, etc.) that is configured to operate in the range of wavelengths from microns to tens of microns or beyond. IR sensor(s) 119 can include a phased array of IR detector elements. Pixels of IR images produced by IR sensor(s) 119 can be representative of the total amount of IR radiation collected by a respective detector element (associated with the pixel), of the temperature of a physical object whose IR radiation is being collected by the respective detector element, or any other suitable physical quantity.

The sensing data obtained by the sensing system 110 can be processed by a data processing system 120 of AV 100. For example, the data processing system 120 can include a perception system 130. The perception system 130 can be configured to detect and track objects in the driving environment 101 and to recognize the detected objects. For example, the perception system 130 can analyze images captured by the cameras 118 and can be capable of detecting traffic light signals, road signs, roadway layouts (e.g., boundaries of traffic lanes, topologies of intersections, designations of parking places, and so on), presence of obstacles, and the like. The perception system 130 can further receive radar sensing data (Doppler data and ToF data) to determine distances to various objects in the environment 101 and velocities (radial and, in some implementations, transverse, as described below) of such objects. In some implementations, the perception system 130 can use radar data in combination with the data captured by the camera(s) 118, as described in more detail below.

The perception system 130 can include one or more components to facilitate detection, classification, and tracking of objects, including an end-to-end perception model (EEPM) 132 that can be used to process data provided by the sensing system 110. More specifically, in some implementations, EEPM 132 can receive data from sensors of different sensing modalities. For example, EEPM 132 can receive images from at least some of lidar(s) 112, radar(s) 114, and (optical range) camera(s) 118, IR sensor(s) 119, sonar(s) 116 and the like. In particular, EEPM 132 can include one or more trained machine-learning models (MLMs) that are used to process some or all of the above data to detect, classify, and track motion of various objects in the driving environment 101. EEPM 132 can use multiple classifier heads to determine various properties of the outside environment, including but not limited to occupation of space with various objects, types of the objects, motion of the objects, identification of objects that can be occluded, relation of the objects to the roadway, to other objects, and to the traffic flow. Various models of EEPM 132 can be trained using multiple sets of images/data, annotated to identify specific features in the respective sensing data. In some implementations, the perception system 130 can include a behavior prediction module (BPM) 134 that predicts future motion of the detected objects.

The perception system 130 can further receive information from a Global Navigation Satellite System (GNSS) positioning subsystem (not shown in FIG. 1), which can include a GNNS transceiver (not shown), configured to obtain information about the position of the AV relative to Earth and its surroundings. The positioning subsystem can use the positioning data, e.g., GNNS and inertial measurement unit (IMU) data in conjunction with the sensing data to help accurately determine the location of the AV with respect to fixed objects of the driving environment 101 (e.g., roadways, lane boundaries, intersections, sidewalks, crosswalks, road signs, curbs, surrounding buildings, etc.) whose locations can be provided by map information 124. In some implementations, the data processing system 120 can receive non-electromagnetic data, such as audio data (e.g., ultrasonic sensor data from sonar 116 or data from microphone picking up emergency vehicle sirens), temperature sensor data, humidity sensor data, pressure sensor data, meteorological data (e.g., wind speed and direction, precipitation data), and the like.

The data processing system 120 can further include an environment monitoring and prediction component 126, which can monitor how the driving environment 101 evolves with time, e.g., by keeping track of the locations and velocities of the animated objects (e.g., relative to Earth). In some implementations, the environment monitoring and prediction component 126 can keep track of the changing appearance of the environment due to a motion of the AV relative to the environment. In some implementations, the environment monitoring and prediction component 126 can make predictions about how various animated objects of the driving environment 101 will be positioned within a prediction time horizon. The predictions can be based on the current state of the animated objects, including current locations (coordinates) and velocities of the animated objects. Additionally, the predictions can be based on a history of motion (tracked dynamics) of the animated objects during a certain period of time that precedes the current moment. For example, based on stored data for a first object indicating accelerated motion of the first object during the previous 3-second period of time, the environment monitoring and prediction component 126 can conclude that the first object is resuming its motion from a stop sign or a red traffic light signal. Accordingly, the environment monitoring and prediction component 126 can predict, given the layout of the roadway and presence of other vehicles, where the first object is likely to be within the next 3 or 5 seconds of motion. As another example, based on stored data for a second object indicating decelerated motion of the second object during the previous 2-second period of time, the environment monitoring and prediction component 126 can conclude that the second object is stopping at a stop sign or at a red traffic light signal. Accordingly, the environment monitoring and prediction component 126 can predict where the second object is likely to be within the next 1 or 3 seconds. The environment monitoring and prediction component 126 can perform periodic checks of the accuracy of its predictions and modify the predictions based on new data obtained from the sensing system 110. The environment monitoring and prediction component 126 can operate in conjunction with EEPM 132. For example, the environment monitoring and prediction component 126 can track relative motion of the AV and various objects (e.g., reference objects that are stationary or moving relative to Earth).

The data generated by the perception system 130, the GNSS processing module 122, and the environment monitoring and prediction component 126 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the driving environment 101, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In one example, EEPM 132 can determine that images obtained by camera(s) 118 include depictions of an object and can further classify the object as a bicyclist. The environment monitoring and prediction component 126 can track the bicyclist and determine that the bicyclist is traveling with the speed of 15 mph along an intersecting road perpendicular to the direction of the motion of the vehicle. Responsive to such a determination, the BPM 134 can determine that the vehicle needs to slow down to let the bicyclist clear the intersection. The AVCS 140 can output instructions to the powertrain, brakes, and steering 150 (directly or via the vehicle electronics 160) to: (1) reduce, by modifying the throttle settings, a flow of fuel to the engine to decrease the engine rpm; (2) downshift, via an automatic transmission, the drivetrain into a lower gear; and (3) engage a brake unit to reduce (while acting in concert with the engine and the transmission) the vehicle's speed. After EEPM 132 and/or the environment monitoring and prediction component 126 determined that the bicyclist has crossed the intersection, the AVCS 140 can output instructions to the powertrain, brakes, and steering 150 to resume the previous speed settings of the vehicle.

The output of EEPM 132 can be used for tracking of detected objects. In some implementations, tracking can be reactive and can include history of poses (positions and orientations) and velocities of the tracked objects. In some implementations, tracking can be proactive and can include prediction of future poses and velocities of the tracked objects. In some implementations, future predictions can be generated by BPM 134, e.g., based at least partially on the output of EEPM 132. In some implementations, tracking-by-detection or instance segmentation can be used instead of building an explicit tracker. For example, an interface of BPM 134 can include, for each object, a history of recent object locations, extents, headings and velocities. In some implementations, flow information can be defined with reference to units of three-dimensional space (voxels). For additional accuracy of prediction, flow information associated with individual voxels can include not only velocities but also kinematic attributes, such as curvature, yaw rate, and the like. Based on this data, BPM 134 can predict future trajectories in a way that is advantageous over a more traditional tracking approach. In some implementations, an alternative approach can be used that deploys a recurrent neural network (RNN) to smooth and interpolate locations and velocities over time, which may be performed similarly to operations of a Kalman filter.

The output of EEPM 132 can be used for vehicle localization. In some implementations, BPM 134 can use lidar-based global mapping that maps an entire region of 3D environment around the vehicle. In some implementations, BPM 134 can deploy a simpler system that uses accelerometry, odometry, GNNS data, as well as camera-based lane mapping to identify the current position of the vehicle relative to the map data.

In different implementations, BPM 134 can have different levels of sophistication depending on the driving environment 101 (e.g., highway driving, urban driving, suburban driving, etc.). In L2 systems ("hands on the wheel"), where the driver is expected at any time to take over the vehicle's control, BPM 134 can have a minimum functionality and be able to predict behavior of other road users within a short time horizon, e.g., several seconds. For example, such predictions can include impeding lane changes by other vehicles ("agents"). BPM 134 can use various cues, such as a turning signal, front wheel turning, a driver turning the head in the direction of a turn, and the like. BPM 134 can determine if such impending lane changes require driver's attention. In the instances where a lane changing agent is sufficiently far from the vehicle, AVCS 140 acting on BPM 134 prediction can change the vehicle's trajectory (e.g., slow the vehicle down) without driver's involvement. In the instances where a change requires immediate driver's attention, BPM 134 can output a signal to the driver indicating that the driver should take over controls of the vehicle.

In L3 systems ("hands off the wheel"), the objective can be to provide an autonomous driving function for at least a certain time horizon (e.g., X seconds), such that if a condition arises that requires the driver's control, this condition will be predicted at least X seconds prior to its occurrence. The map data can further include camera and/or radar images of prominent landmarks (bridges, signs, roadside structures, etc.). In some implementations, BPM 134 of L3 systems may at any given time output two trajectories, Option A and a backup Option B, for X seconds. For example, when traveling on a city street in the rightmost lane of the street, BPM 134 can compute Option A for the vehicle to remain in the rightmost lane and can further compute Option B for the vehicle to move over to the left lane if a parked vehicle veers into the leftmost lane. BPM 134 can predict that within X seconds into the future the left lane is to remain available and continue vehicle operations. At some point, BPM 134 can predict that the left lane has a fast-moving agent that is to move close enough to the vehicle to make the left lane (and thus Option B) unavailable to the vehicle. Having determined that Option B is likely to become unavailable, BPM 134 can call the driver to take control of the vehicle. In yet even more sophisticated systems, where driver's input is not expected (e.g., autonomous L4 systems), if Option B disappears, AVCS 140 can stop the vehicle on the side of the road until the driving situation changes favorably.

To achieve reliable predictions, BPM 134 can simulate multiple possible scenarios how different road users can behave in different ways and estimate the probability of various such scenarios and the corresponding outcomes. In some implementations, BPM 134 can use a closed-loop approach and determine a distribution of probabilities that, if the vehicle makes a certain driving path change (or maintains the current driving path), other vehicles are to respond in a certain way, e.g., to yield to the vehicle or to accelerate or otherwise block the vehicle's driving path. BPM 134 can evaluate multiple such scenarios and output probabilities for each or at least some of the scenarios. In some implementations, BPM 134 can use an open-loop approach, in which predictions are made based on the current state of motion of the agents and the changes of the motion of the vehicle do not affect the behavior of other agents. In some implementations, predicted locations of various agents can be represented via future occupancy heatmaps. Further details regarding the EEPM 132 will now be described below with reference to FIGS. 2-13.

Figures 2, 3A:
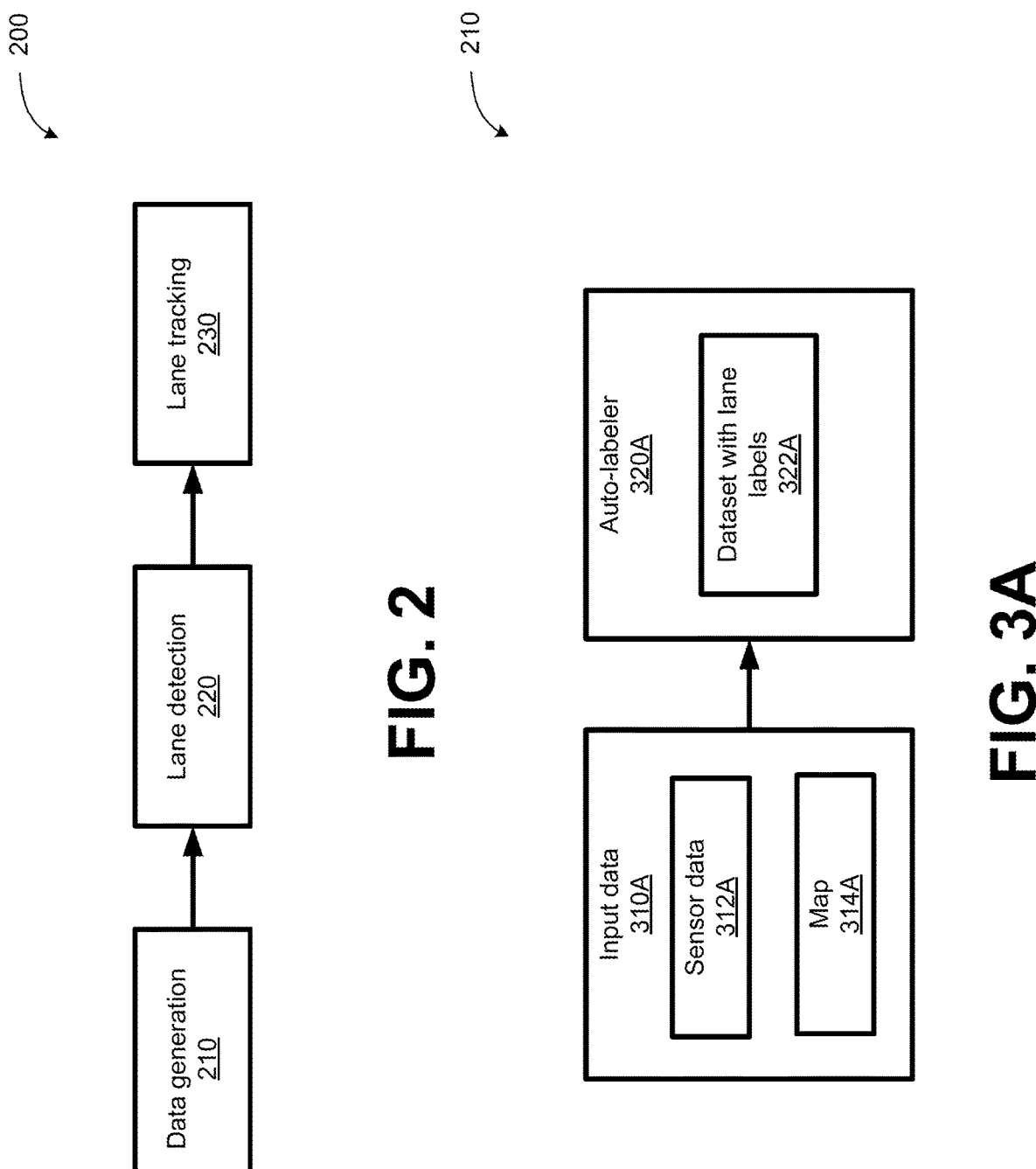
FIG. 2 is a diagram of an example system for implementing autonomous vehicle (AV) lane understanding systems using filter-based lane tracking, in accordance with some implementations of the present disclosure.
FIGS. 3A-3B are diagrams of example data generation systems of an autonomous vehicle (AV) lane understanding system, in accordance with some implementations of the present disclosure.

FIG. 2 is a diagram of an example system 200 for implementing AV lane understanding systems using filter-based lane tracking, in accordance with some implementations of the present disclosure. As shown, system 200 can include lane detection data generation component ("data generation component") 210, lane detection component 220 and lane tracking component 230.

Data generation component 210 can be used to generate a set of data. The set of data can include a dataset with lane detection labels ("lane labels"). In some implementations, data generation component 210 includes an auto-labeler to generate a dataset with lane labels. For example, a map, also referred to herein as a roadgraph, can be used to automatically generate lane labels. In some implementations, a map is a high-definition (HD) map. In some implementations, data generation component 210 applies geo-splitting to ensure that no examples from training locations are included in validation and testing datasets. In general, geo-splitting refers to dividing a dataset into groups based on geographic location. For example, geographical coordinates (e.g., latitudinal/longitudinal coordinates) can be used to generate a grid of cells. Each datapoint of a dataset can correspond to a cell of the grid, which enables the dataset to be divided into groups. Geo-splitting can be used to improve model performance and reduce overfitting risk. Further details regarding data generation component 210 will now be described below with reference to FIGS. 3A-3B.

FIG. 3A is a diagram of example data generation component 210, in accordance with some implementations of the present disclosure. As shown, data generation component 210 can include input data 310A. Input data 310A can include sensor data 312A and map 314A. In some implementations, sensor data 312A includes camera data and radar data. In some implementations, map 314 includes a high-definition (HD) map. As further shown, data generation component 210 can include auto-labeler 320A. Auto-labeler 320A can generate, based on input data 310A, dataset with lane labels 322A. In some implementations, auto-labeler 320A uses at least one machine learning (ML) model trained to generate dataset 322A.

For example, to generate dataset 322A, auto-labeler 320A can identify (e.g., select) a set of lane features from map 314. The set of lane features can include, for example, a lane marking, a lane center, a lane edge (e.g., curb), etc. Auto-labeler 320A can then extract, for the set of lane features, a first set of polyline sample coordinates in a global (e.g., Earth) coordinate frame. Auto-labeler 320A can then transform, using a position of the AV, the first set of polyline sample coordinates into a second set of polyline sample coordinates in an AV-centric coordinate frame. Auto-labeler 320A can further remove any lane features of the set of lane features that are not observable from sensor data. To do so, for example, auto-labeler 320A can compare the distances of lane features and nearest static geometries in map 314 (e.g. buildings, walls, roads), and mark a point as "occluded" if it is behind any static geometry.

Figure 3B:
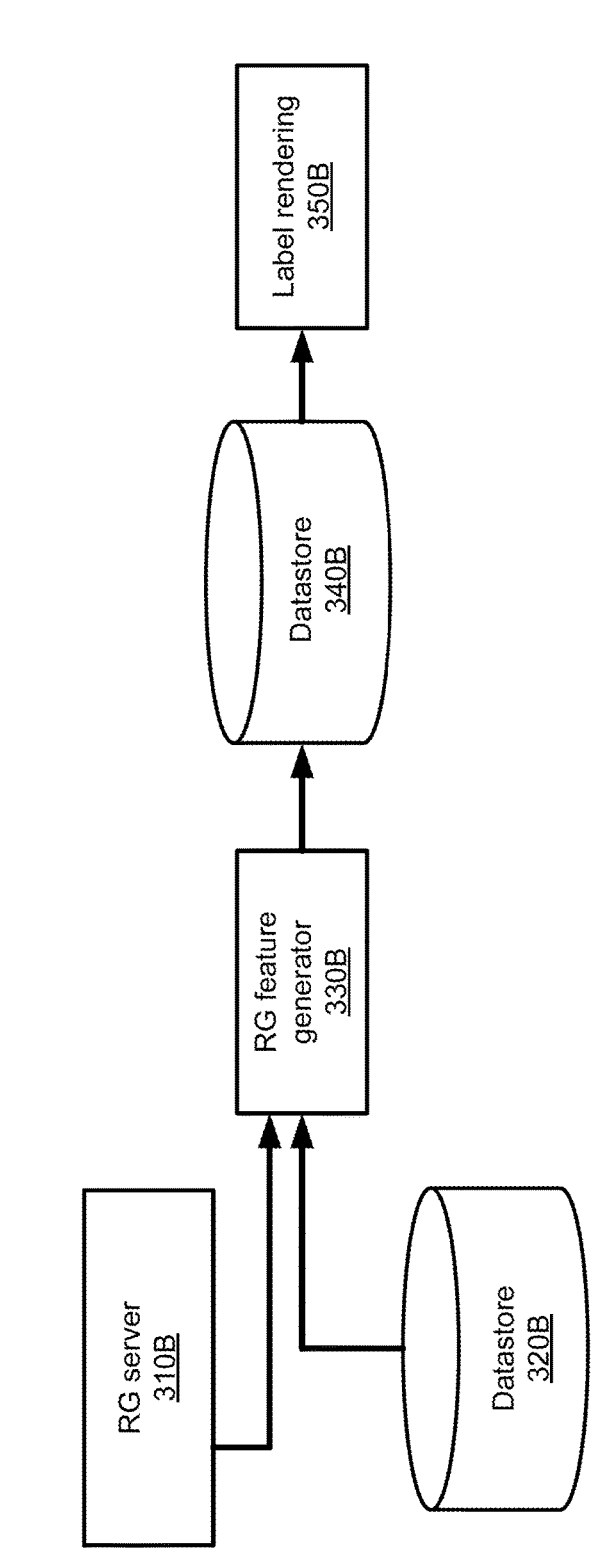

FIG. 3B is a diagram of example system 300 for automatically generating lane labels, in accordance with some implementations of the present disclosure. As shown, system 300 can include roadgraph (RG) server 310B, unified datastore 320B, RG feature generator 330B, dataset with RG store 340B and label rendering component 350B. RG feature generator 330B can generate (e.g., update) a dataset with RG features and store the dataset within store 340B. Generating the dataset can include querying RG features, and inferring an RG topology based on the RG features. In some implementations, visibility filtering of the RG features is performed prior to inferring the RG topology to remove features not visible to AV cameras. Inferring an RG topology can include inferring lane association of vehicle label boxes and lane boundary polylines. The dataset generated by RG feature generator 330B can include raw polyline point coordinates. The dataset generated by RG feature generator 330B can further include attributions, like feature type (dashed white marker, or a road edge), visibility status, etc. Label rendering component 350B can use the raw polyline point coordinates to render heatmap labels during training (e.g., on-the-fly rendering).

Referring back to FIG. 2, lane detection component 220 can perform lane detection based on a set of data received from data generation component 210 (e.g., the dataset with lane labels 322A of FIG. 3A). In some implementations, performing lane detection includes generating at least one heatmap based on the set of data, and detecting at least one polyline within the at least one heatmap. More specifically, each polyline can represent a lane. For example, lane detection component 220 can implement a BEV feature extraction system that can extract a set of BEV features from sensor data (e.g., camera data and radar data), using a set of feature networks, generate a fused BEV feature by fusing each BEV feature of the set of BEV features, and process the fused BEV feature using a BEV feature network to generate the at least one heatmap. In some implementations, extracting the set of BEV features includes extracting at least a camera BEV feature from camera data and extracting a radar BEV feature from radar data. More specifically, extracting a camera BEV feature from camera data can include using a camera data feature network to transform the camera data into the camera BEV feature, and extracting a radar BEV feature from radar data can include using a radar feature network to transform the radar data into the radar BEV feature. Generating the fused BEV feature can include fusing at least the camera BEV feature and the radar BEV feature. Further details regarding lane detection component 220 will now be described in further detail below with reference to FIGS. 4-6E.

Figures 4, 5A:
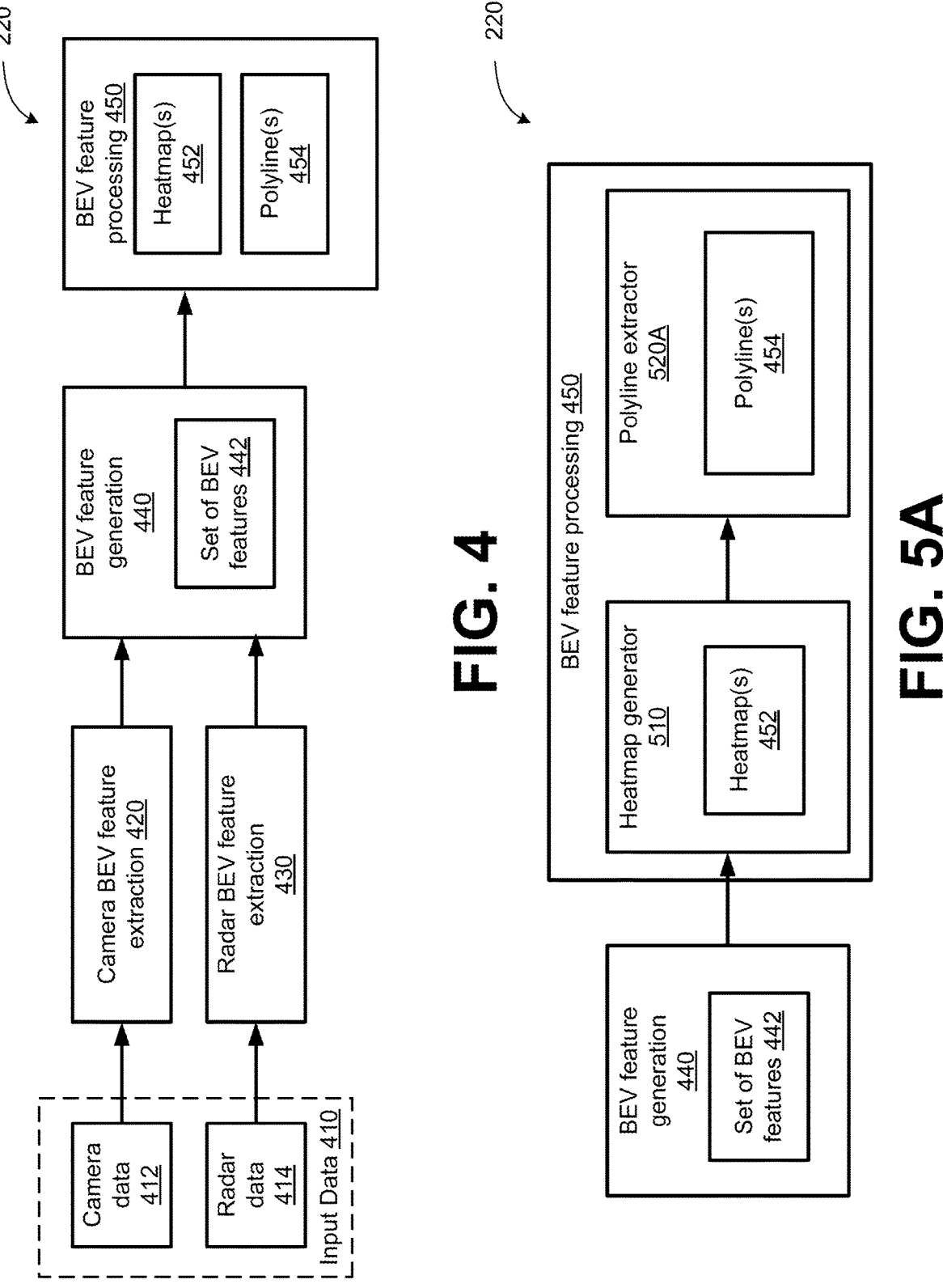
FIG. 4 is a diagram of an example lane detection system of an autonomous vehicle (AV) lane understanding system, in accordance with some implementations of the present disclosure.
FIG. 5A is a diagram of an example lane detection system including a polyline extractor, in accordance with some implementations of the present disclosure.

FIG. 4 is a diagram illustrating example lane detection component 220, in accordance with some implementations of the present disclosure. For example, FIG. 4 can represent a network architecture of an EEPM (e.g., EEPM 132) that can be deployed as part of a perception system of an AV (e.g., AV 100). Input data 410 can include data obtained by various components of the sensing system 110 (as depicted in FIG. 1), e.g., lidar(s) 112, radar(s) 114, optical (e.g., visible) range camera(s) 118, IR sensors (s) 119. For example, as shown, the input data 410 can include camera data 412 and radar data 414. Although not shown, the input data 410 can further include, e.g., lidar data.

Input data 410 can include images, radar and/or any other data, e.g., voxel intensity, velocity data associated with voxels, as well as metadata, such as timestamps. Input data 410 can include directional data (e.g., angular coordinates of return points), distance data, and radial velocity data, e.g., as can be obtained by lidar(s) and/or radar(s). It should be understood that this list of input data 410 is not exhaustive and any suitable additional data can be used as part of input data 410, e.g., IMU data, GNNS data, and the like. Each of the modalities of input data 410 can be associated with a specific instance of time when the data was acquired. A set of available data (e.g., a lidar image, a radar image, a camera image, and/or an IR camera image, etc.) associated with a specific instance of time can be referred to as a sensing frame. In some implementations, the images obtained by different sensors can be synchronized, so that all images in a given sensing frame have the same (up to an accuracy of synchronization) timestamp. In some implementations, some images in a given sensing frame can have (controlled) time offsets.

An image obtained by any of sensors can include a corresponding intensity map $I(\{x_j\})$ where $\{x_j\}$ can be any set of coordinates, including three-dimensional (spherical, cylindrical, Cartesian, etc.) coordinates (e.g., in the instances of lidar and/or radar images), or two-dimensional coordinates (in the instances of camera data). Coordinates of various objects (or surfaces of the objects) that reflect lidar and/or radar signals can be determined from directional data (e.g., polar $\theta$ and azimuthal p angles in the direction of lidar/radar transmission) and distance data (e.g., radial distance R determined from the ToF of lidar/radar signals). The intensity map can identify intensity of sensing signals detected by the corresponding sensors. Similarly, lidar and/or radar sensors can produce Doppler (frequency shift) map, $\Delta f(\{x_j\}$ that identifies radial velocity of reflecting objects based on detected Doppler shift $\Delta f$ of the frequency of the reflected radar signals, $V=\lambda\Delta f/2$, where $\lambda$ is the lidar/radar wavelength, with positive values $\Delta f>0$ associated with objects that move towards the lidar/radar (and, therefore, the vehicle) and negative values $\Delta f<0$ associated with objects that move away from the lidar/radar. In some implementations, e.g., in driving environments where objects are moving substantially within a specific plane (e.g., ground surface), the radar intensity map and the Doppler map can be defined using two-dimensional coordinates, such as the radial distance and azimuthal angle: $I(R, \phi), \Delta f(R, \phi)$.

Camera BEV feature extraction component 420 can receive camera data 412 and extract a camera BEV feature from camera data 412. Extracting a camera BEV feature from camera data 412 can include extracting a set of camera data features from camera data 412, and transforming the set of camera data features into the camera BEV feature.

In some implementations, a camera data feature is a two-dimensional (2D) camera data feature. For example, the set of camera data features can include a set of camera data feature vectors. Camera BEV feature extraction component 420 can include a camera data feature network. Camera BEV feature extraction component 420 can use any suitable perspective backbone(s) to obtain the set of camera data features. Examples of suitable perspective backbones include Resnet, EfficientNet, etc. In some implementations, each camera sensor (e.g., front-facing camera, rear-facing camera, etc.) can use the same vision backbone (e.g., same shared weights) in training to avoid learning viewpoint-specific priors that can be used to avoid performance of EEPM 132 to be affected by vehicle yaws. Each camera data feature can be associated with a particular pixel or a cluster of pixels. Each pixel (or a cluster of pixels) may be associated with a respective depth distribution and a respective depth feature. In some implementations, the processed camera data can be downsampled for computational efficiency. In some implementations, pseudo-cameras can be used. Pseudo-cameras represent crops of the images from the full resolution images to provide finer detail for long range tasks. The pseudo-cameras can have a fixed crop or a crop that is driven from an output of the coarse resolution backbone. In some implementations, the crops can be trained directly. In some implementations, differentiable cropping can be used to train the attention mechanism end-to-end.

In some implementations, transforming the set of camera data features into the camera BEV feature can include transforming the set of camera data features into a set of pixel points utilizing camera data feature projection. For example, the set of pixel points can be a pixel point cloud. In some implementations, utilizing camera data feature projection includes performing a lift transformation with respect to 2D camera data (e.g., from 2D backbones, sensor intrinsics and extrinsics (or derived intrinsics and extrinsics for pseudo-cameras)). To do so, 2D camera data can be projected to a three-dimensional (3D) space. This projection can be done using various depth distribution techniques. During training, depth ground truth can be available from other sensor data (e.g., lidar data) and can be used as a structured loss. Output of other sensors that can provide 2D images (e.g., IR cameras) can be processed using the same (or similar) architecture. Accordingly, the transformation of the set of camera data features into the camera BEV feature can provide a lifted camera "context" combined across the cameras of the AV.

More specifically, the lift transformation can combine depth distributions and the set of camera data features (e.g., feature vectors). As an illustrative example, the lift transformation can supplement each pixel w, h, described by a feature vector $FV(c)_{w,h}$ with depth information from depth distributions. For example, the lift transformation can compute an outer product of each feature vector $FV(c)_{w,h}$ (of dimensions C×1) with the corresponding depth distribution $P(d)_{w,h}$ (of dimensions D×1) for the same pixel. The output of the lift transformation can be a feature that can be represented by, e.g., $FV(c)_{w,h} \otimes P(d)_{w,h} = FT(c,d)_{w,h}$ for pixel w, h.

Feature tensors $FT(c,d)_{w,h}$ computed for individual pixels can then be used to obtain a combined feature tensor for the whole image, e.g., by concatenating feature tensors for different pixels: $\{FT(c,d)_{w,h}\} \rightarrow CFT(c,d,w,h)$. The combined feature tensor $CFT(c,d,w,h)$ has dimensions $C \times D \times W \times H$. The combined feature tensor can then undergo a 2D mapping. More specifically, 2D mapping can produce a projected feature tensor that uses a convenient set of plane coordinates, e.g., Cartesian coordinates x and y or polar coordinates r and $\theta$ within the plane of the ground.

2D mapping can be a two-part transformation. During the first part, perspective coordinates d, w, h can be transformed into 3D Cartesian coordinates d, w, h→x, y, z (or 3D cylindrical coordinates, w, h→r, $\theta$, z), with z being the vertical coordinate (in the direction perpendicular to the ground). The transformation d, w, h→x, y, z can be a projective transformation, parameterized with a focal length of the camera, direction of the optical axis of the camera, and other similar parameters. In the instances where images are acquired by multiple cameras (or a camera with a rotating optical axis), the transformation d, w, h→x, y, z can include multiple projective transformations, e.g., with a separate transformation used for pixels w, h provided by different cameras.

During the second part, 2D mapping can project the combined feature tensor expressed in the new coordinates, $CFT(c, x, y, z)$, onto a horizontal surface to obtain a projected (BEV) feature tensor. For example, to obtain the $C \times W \times H$ projected feature tensor $PCT(c,x,y)$, the combined feature tensor can be summed (or averaged) over elements associated with each vertical pillar of pixels, e.g., $PCT(c,x, y) = \Sigma_i CFT(c, x, y, z_i)$. In some implementations, the summation over coordinates $z_i$ can be performed with different weights $w_i$ assigned to different coordinates $z_i$: $PCT(c,x,y) = \Sigma_i w_i \times CFT(c, x, y, z_i)$, e.g., with larger weights $w_i$ assigned to pixels that image objects within a certain elevations from the ground (e.g., up to several meters) and lower weights assigned to other elevations (e.g., to eliminate spurious objects, such as tree branches, electric cables, etc., that do not obstruct motion of vehicles). The projected feature tensor can characterize objects and their locations in the BEV in which perspective distortions have been reduced (e.g., eliminated).

Radar BEV feature extraction component 430 can receive radar data 414 and extract a radar BEV feature from radar data 414. Extracting a radar BEV feature from radar data 414 can include extracting a set of radar data features from radar data 414, and transforming the set of radar data features into the radar BEV feature. For example, a radar data feature can be generated for each radar. Radar BEV feature extraction component 430 can include a radar data feature network. Radar BEV feature extraction component 430 can use any suitable radar backbone(s). Examples of suitable radar backbones include PointPillars, Range Sparse Net, etc. Each radar modality (e.g., intensity, second returns, Doppler shift, radar cross section) can have a different radar backbone and a feature generation layer. In some implementations, full periods (spins) of lidar/radar sensors can be used to obtain radar data features. In some implementations, portions of radar periods can be used to obtain radar data features. Processing of portions of such periods can allow an EEPM (e.g., EEPM 132 of FIG. 1) to react faster to new agents (e.g., vehicles, pedestrians, etc.) or sudden movements of existing agents in some cases and operate at the rate of the fastest sensor. In some implementations, transforming the set of radar data features into the radar BEV feature can include transforming the set of radar data features into a set of radar points utilizing radar data feature transformation. For example, the set of radar points can be a radar point cloud.

BEV feature generation component 440 can generate set of BEV features 442 from the extracted BEV features (e.g., the camera BEV feature and the radar BEV feature). In some implementations, set of BEV features 442 includes a fused BEV feature generated by fusing at least the camera BEV feature and the radar BEV feature. In some implementations, generating the fused BEV feature includes performing temporal aggregation based on a set of prior frames.

BEV feature processing component 450 can process the fused BEV feature to generate at least one heatmap 452. In some implementations, generating the at least one heatmap 455 can include predicting the at least one heatmap 455 using a set of lane detection classifier heads ("heads"). For example, a head can be a heatmap head. Each head of the set of heads is designed to make a prediction for a respective lane attribute of a lane. For example, a set of multi-layer perceptrons (MILPs) can be attached to a BEV embedding to output the set of heads. Further details regarding generating at least one heatmap 452 will be described below with reference to FIGS. 5A-5D.

BEV feature processing component 450 can further obtain at least one polyline 454 using at least one heatmap 452. In some implementations, obtaining at least one polyline 454 includes extracting at least one polyline 454. For example, at least one polyline 454 can be extracted from at least one heatmap 452 using vectorization. Further details regarding polyline extraction will now be described below with reference to FIG. 5A.

FIG. 5A is a diagram of an example lane detection system 220 implementing polyline extraction, in accordance with some implementations of the present disclosure. As shown, BEV feature processing component 450 can include heatmap generator 510 to generate at least one heatmap 452, and polyline extractor 520A to extract at least one polyline 454 from at least one heatmap 452 to obtain a set of polylines. In some implementations, extracting at least one polyline 454 includes vectorizing at least one heatmap 452. For example, a greedy algorithm can be used to extract at least one polyline 454 from high-probability regions of at least one heatmap 452. It may be the case that a polyline extracted by processing at least one heatmap 452 (e.g., by using the greedy algorithm) can be unsmooth. To address this, in some implementations, extracting at least one polyline 454 includes extracting at least one base polyline, and smoothing the at least one base polyline to obtain at least one polyline 454. For example, smoothing a base polyline can include fitting a third-order polynomial line to the base polyline. In some implementations, each base polyline is smoothed to obtain at least one polyline 454. An illustrative example of polyline extraction is described below with reference to FIGS. 6A-6E.

Referring back to FIG. 4, polyline extraction can have some drawbacks. For example, dense pixel loss may not be able to capture the line shape of lane markers and road edges. Additionally, some implementations of polyline extraction can be slow. In some implementations, obtaining at least one polyline 454 includes generating at least one polyline 454. For example, generating at least one polyline 454 can include predicting at least one polyline 454 using a generative model. A generative model is capable of generating new data that is similar to the training data that the generative model was trained on. This is in contrast to discriminative models, which are trained to predict labels based on input data (e.g., classification). More specifically, a generative model can learn patterns and/or structures in the training data that are used to create new data representing original data. Further details regarding polyline generation will now be described below with reference to FIG. 5B.

Figures 5B, 5C:
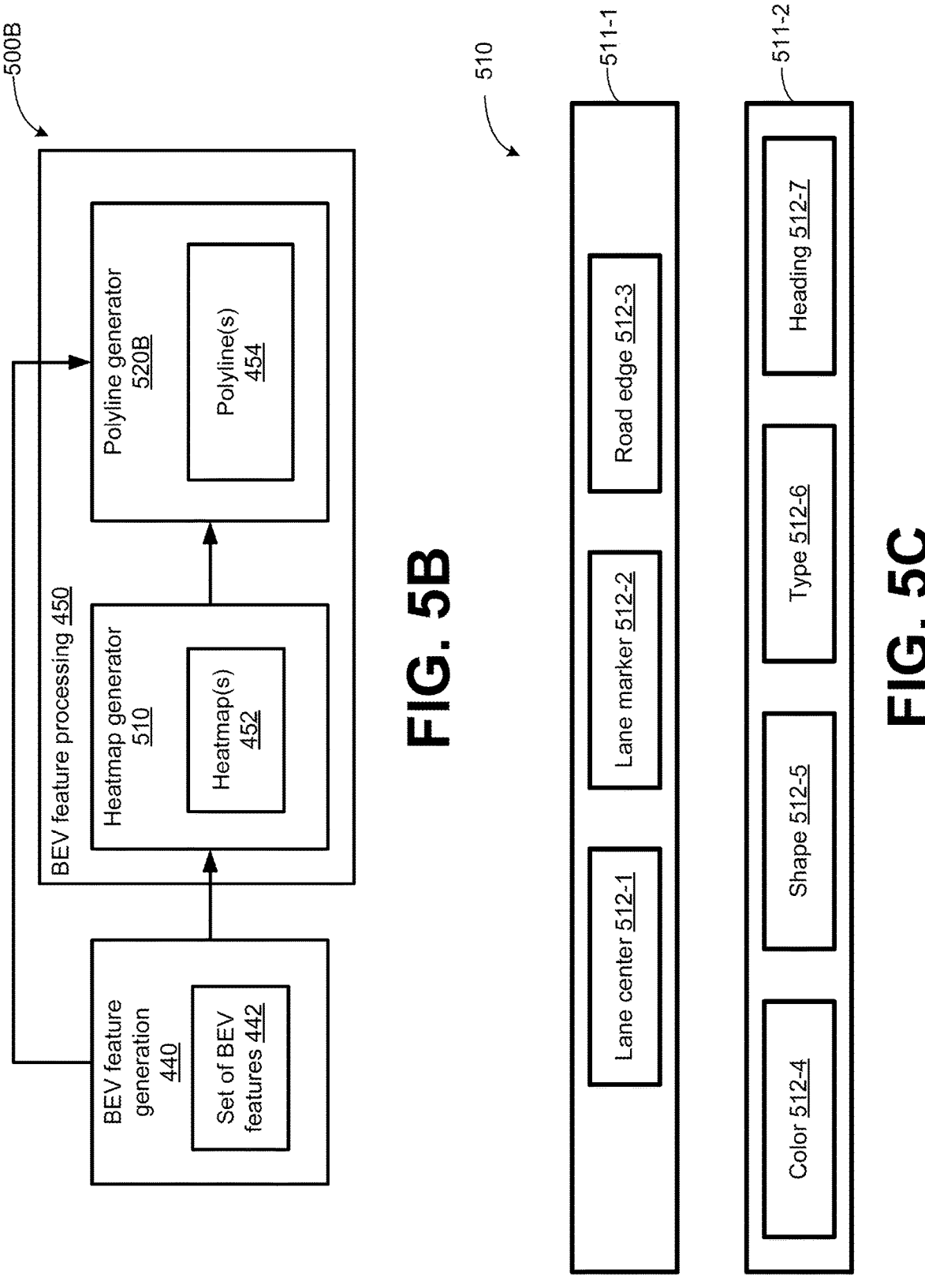
FIG. 5B is a diagram of an example lane detection system including a polyline generator, in accordance with some implementations of the present disclosure.
FIG. 5C is a diagram of example lane detection classifier heads of a heatmap generator of a lane detection system, in accordance with some implementations of the present disclosure.

FIG. 5B is a diagram of an example lane detection system 220 implementing polyline generation, in accordance with some implementations of the present disclosure. As shown, BEV feature processing component 450 can include heatmap generator 510 to generate at least one heatmap 452 (similar to heatmap generator 510 of FIG. 5A), and polyline generator 520B to generate at least one polyline 454 using a set of input data. For example, the set of input data can include set of BEV features 445 and at least one heatmap 452. In some implementations, generating at least one polyline 454 includes using a generative model. Examples of generative models include variational autoencoders (VAEs), generative adversarial networks (GANs), diffusion models, autoregressive models, and transformers.

For example, a transformer includes an encoder-decoder architecture that implements a self-attention mechanism that can be used to process sequential data in parallel. A transformer can understand spatial relationships by employing positional encoding, in which a unique vector representation is used to encode a relative position of the data. More specifically, a transformer input can be generated using set of BEV features 442 and at least one heatmap 452, and the transformer input can be provided to the transformer to generate at least one polyline 454.

In some implementations, the transformer input includes a one-dimensional (1D) feature. For example, generating the transformer input includes concatenating set of BEV features 442 and at least one heatmap 452 to obtain a concatenated 3D feature, downsampling the concatenated 3D feature to obtain a 2D feature, and flattening the 2D feature to obtain a one-dimensional (1D) feature as the transformer input.

In some implementations, the transformer input includes a set of tokens. More specifically, generating the transformer input includes using a tokenizer to generate the set of tokens. The tokenizer can split input data into a set of patches, where each patch represents a respective token of the set of tokens. Each token can be assigned a unique numerical identifier or index. Positional encoding can be performed by assigning a unique vector representation to each token based on its relative position within the input data. Each token, along with its corresponding positional encoding, can then be provided as input to the transformer.

An encoder of the transformer can receive the transformer input (e.g., the 1D feature), and process the transformer input through multiple layers of self-attention and feedforward neural networks to generate an encoder output. The encoder output is an encoded representation of the transformer input. A decoder of the transformer can receive a decoder input, and generate a decoder output using the decoder input by attending to the relevant parts of the transformer input. For example, the decoder input can include the encoder output and a set of learnable embeddings. The decoder output can include a set of multilayer perceptron (MLP) inputs. Each MLP input can be provided as input into a respective MLP to generate a respective polyline. Each polyline can have a defined number of points. In some scenarios, such as a freeway, a lane line can be very long, can predicting a polyline corresponding to the lane line can be very difficult. To address this, a length of a lane line can be divided into a number of ranges, a respective set of polylines can be predicted for each range, and each set of polylines can be concatenated during post-processing to obtain at least one polyline 454. Illustratively, for a 200 meter (m) lane line, a first set of polylines can be predicted for a range from 0-48 m, a second set of polylines can be predicted for a range from 48-120 m, and a third set of polylines can be predicted for a range from 120-200 m. The first, second and third sets of polylines can then be concatenated during post-processing. Training the transformer can include using Hungarian matching to associate predicted points and label points and compute loss on point coordinates. An example polyline generator 520B that utilizes a transformer to generate at least one polyline 454 will be described below with reference to FIG. 5E.

FIG. 5C is a diagram illustrating example set of heads of heatmap generation component 510, in accordance with some implementations of the present disclosure. In some implementations, as shown, the set of heads can include set of lane existence heads 511-1 to encode a set of lane attributes related to an existence of a lane. Examples of lane existence heads can include lane center head 512-1 corresponding to a lane center, lane marker head 512-2 corresponding to a lane marker, road edge head 512-3 corresponding to a road edge (e.g., curb), etc. In some implementations, as further shown, the set of heads further includes set of lane marker attribute heads 511-2 to encode a set of lane marker attributes related to at least one lane marker of a lane. Examples of lane marker attribute heads can include lane marker color head 512-4 corresponding to a lane marker color (e.g., white or yellow), lane marker shape head 512-5 corresponding to a lane marker shape (e.g., single line or double line), lane marker type head 512-6 corresponding to a lane marker type (e.g., broken line, solid line, passing line), lane marker heading head 512-7 corresponding to a lane marker heading, etc. In some implementations, lane marker headings are represented by yaw angles. A yaw angle is an angle between a line segment and a reference axis (e.g., positive X-axis). However, yaw angles may not be easy to train using a machine learning model due to 360° ambiguity. To address this, in some implementations, a lane marker heading is represented by a set of trigonometric values predicted for a yaw angle. The yaw angle can then be recovered using the set of trigonometric values. For example, the set of trigonometric values can include a cosine value of the yaw angle and a sine value of the yaw angle. In some implementations, generating the set of heatmaps includes training a machine learning model using the set of heads. Training the machine learning model can include, for each head of the set of heads, computing dense pixel loss using a loss function based on a prediction generated by the head. Further details regarding training a machine learning model using the set of heads will now be described below with reference to FIG. 4C.

Figure 5D:
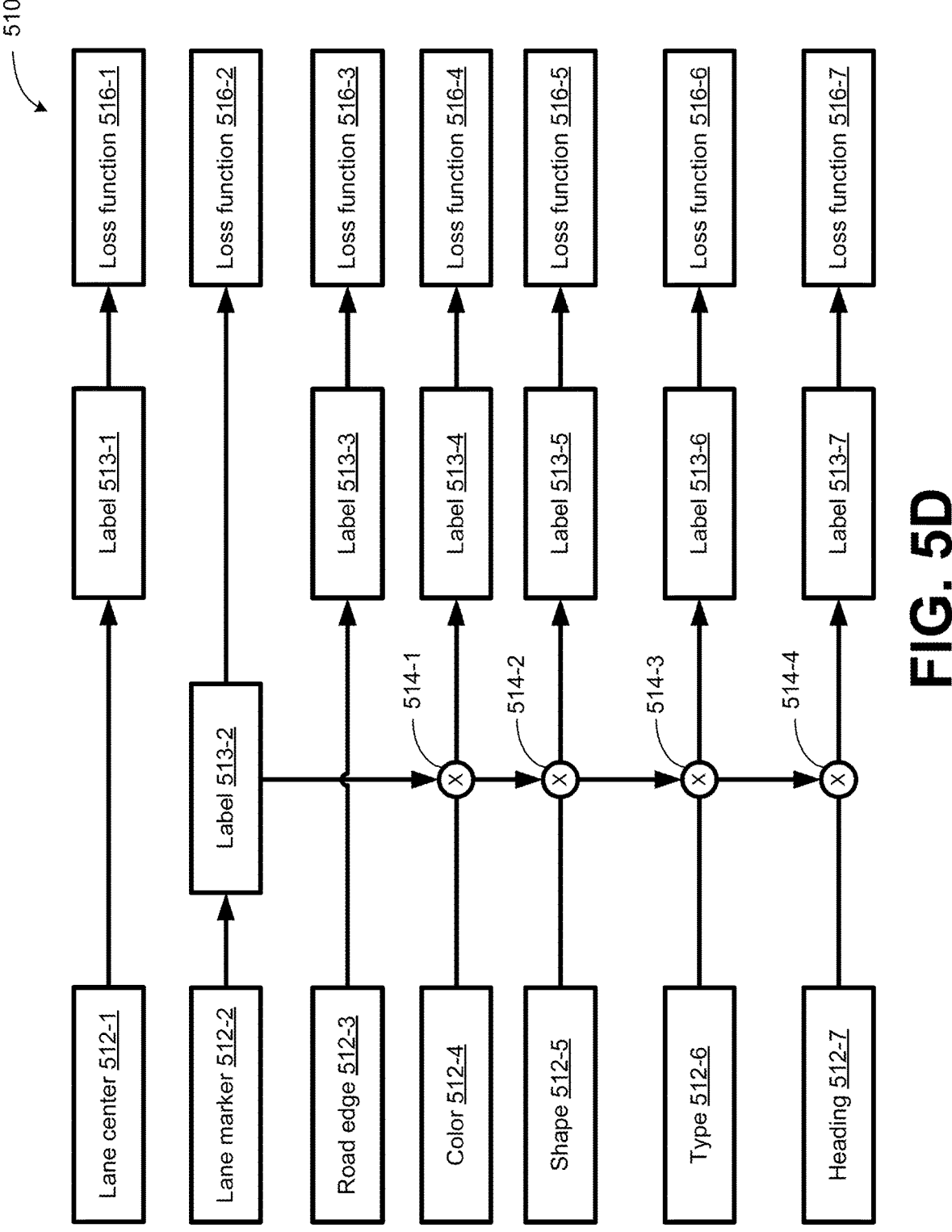
FIG. 5D is a diagram illustrating an example training of lane detection classifier heads of a heatmap generator of a lane detection system, in accordance with some implementations of the present disclosure.

FIG. 5D is a diagram illustrating a machine learning model training architecture that can be used by heatmap generation component 510, in accordance with some implementations of the present disclosure. As shown, heads 512-1 through 512-7 can predict labels 513-1 through 513-7, respectively. Label 513-2 corresponding to lane marker 512-2 can be provided as input into masks 514-1 through 514-4 to generate labels 513-4 through 513-7, respectively. This is because labels 513-4 through 513-7 are generated by lane marker attribute heads.

Moreover, pixel loss can be computed based on labels 513-1 through 513-7 using loss functions 516-1 through 516-7. In some implementations, a loss function is a cross-entropy loss function. Generally, a cross-entropy loss function can generate a cross-entropy that can be used to train a classification model including at least two classes. Cross-entropy is a measure of the difference between a predicted label of a classification model and an actual label. More specifically, the smaller the value of the cross-entropy, the better the classification model is at predicting a label.

In some implementations, a cross-entropy loss function is a binary cross-entropy loss function that can generate a binary cross-entropy used to train a binary classification model (i.e., a classification model involving two classes). Thus, a binary cross-entropy loss function can be used for training binary classification models used to make predictions for lane attributes that involve two classes. For example, a binary cross-entropy loss function can be used to compute dense pixel loss with respect to the lane center (e.g., center or not center), the lane marker (e.g., marker or not marker), the road edge (e.g., edge or not edge), the lane marker color (e.g., yellow or white) and/or the lane marker shape (e.g., single or double). More specifically, loss functions 516-1 through 516-5 can be binary cross-entropy loss functions.

In some implementations, a cross-entropy loss function is a categorical cross-entropy loss function that can generate a categorical cross-entropy used to train a multi-class classification model (e.g., two or more classes). Thus, a categorical cross-entropy loss function can be used for training multi-class classification models used to make predictions for lane attributes that involve two or more classes. For example, a categorical cross-entropy loss function can be used to compute dense pixel loss with respect to lane type (e.g., broken, solid or passing). More specifically, loss function 516-6 can be a categorical cross-entropy loss function.

In some implementations, a loss function is a mean absolute loss function. Generally, a mean absolute loss function can generate a mean absolute loss that can be used to train a regression model. Mean absolute loss is a measure of the difference between mean (i.e., average) difference between predicted labels and actual labels. More specifically, the smaller the value of the mean absolute loss, the better the regression model is at predicting a label. Thus, a mean absolute loss function can be used for training regression models used to make predictions for lane attributes. For example, a mean absolute loss function can be used to compute dense pixel loss with respect to lane heading (e.g., cosine or sine). More specifically, loss function 516-7 can be a mean absolute loss function.

Figure 5E:
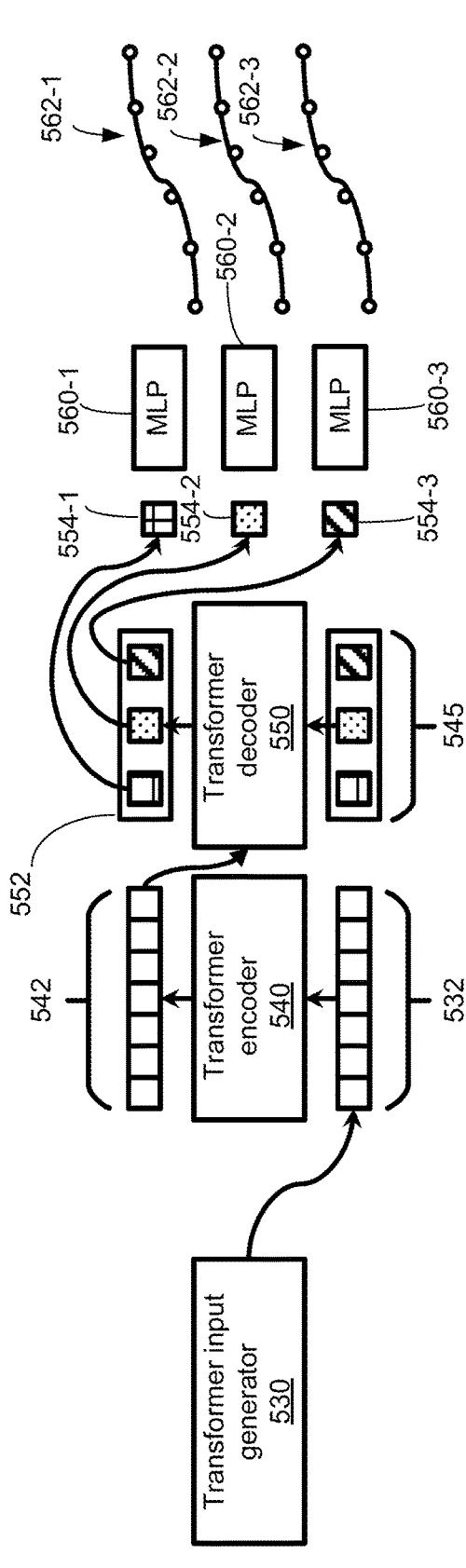
FIG. 5E is a diagram of an example polyline generator of a lane detection system, in accordance with some implementations of the present disclosure.

FIG. 5E is a diagram illustrating example polyline generator 520B, in accordance with implementations of the present disclosure. More specifically, in this illustrative example, polyline generator 520B includes a generative model implemented by a transformer including an encoder-decoder architecture that implements a self-attention mechanism that can be used to process sequential data in parallel.

For example, polyline generator 520B can include transformer input generator 530, transformer encoder 540 and transformer decoder 550. Transformer input generator 530 can generate transformer input 532 using a set of BEV features and at least one heatmap (e.g., set of BEV features 442 and at least one heatmap 452 of FIG. 5B). In some embodiments, transformer input 532 includes a 1D feature. For example, transformer input generator 530 can generate transformer input 532 by concatenating the set of BEV features and the at least one heatmap to obtain a concatenated 3D feature, downsampling the concatenated 3D feature to obtain a 2D feature, and flattening the 2D feature to obtain the 1D feature. In some embodiments, transformer input 532 includes a set of tokens. For example, transformer input generator 530 can generate transformer input 532 by using a tokenizer to generate the set of tokens. Further details regarding generating transformer input 532 are described above with reference to FIG. 5B.

Transformer encoder 540 can receive transformer input 532 and process transformer input 532 through multiple layers of self-attention and feed-forward neural networks to generate encoder output 542. Encoder output 542 is an encoded representation of transformer input 532. Transformer decoder 550 can receive a decoder input including encoder output 542 and set of learnable embeddings 545, and generate decoder output 552 using the decoder input.

Decoder output 552 can include a set of MLP inputs including MLP input 554-1 through 554-3. More specifically, decoder output 552 can include intermediate representations of polylines, and each of MLP inputs 554-1 through 554-3 can be provided as input into a respective one of MLPs 560-1 through 560-3 to predict (e.g., reconstruct) a respective one of polylines 562-1 through 562-3. Although three MLP inputs, three MLPs and three polylines are shown in FIG. 5E, the number of MLP inputs, MLPs and polylines should not be considered limiting.

Each of polylines 562-1 through 562-3 can have a defined number of points. In some scenarios, such as a freeway, a lane line can be very long, and predicting a polyline corresponding to the lane line can be very difficult. To address this, a length of a lane line can be divided into a number of ranges, a respective set of polylines can be predicted for each range, and each set of polylines can be concatenated during post-processing. Illustratively, for a 200 m lane line, a first set of polylines can be predicted for a range from 0-48 m, a second set of polylines can be predicted for a range from 48-120 m, and a third set of polylines can be predicted for a range from 120-200 m. The first, second and third sets of polylines can then be concatenated during post-processing. Training the transformer can include using Hungarian matching to associate predicted points and label points and compute loss on point coordinates. Further details regarding FIG. 5E are described above with reference to FIG. 5B.

Figures 6A, 6B, 6C:
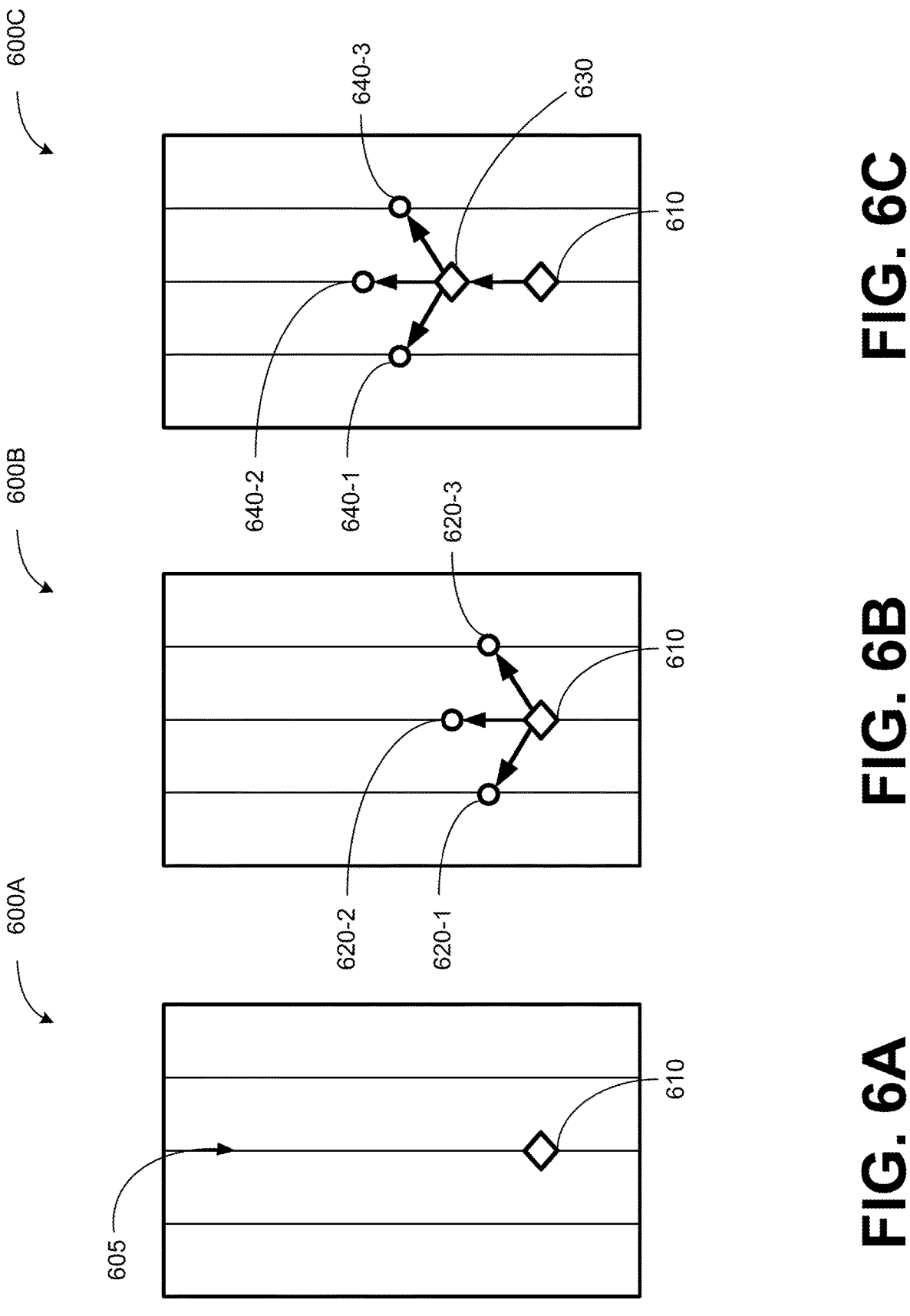
FIGS. 6A-6E are diagrams illustrating an example of polyline extraction performed by a polyline extractor of a lane detection system, in accordance with some implementations of the present disclosure.
Figure 6E:
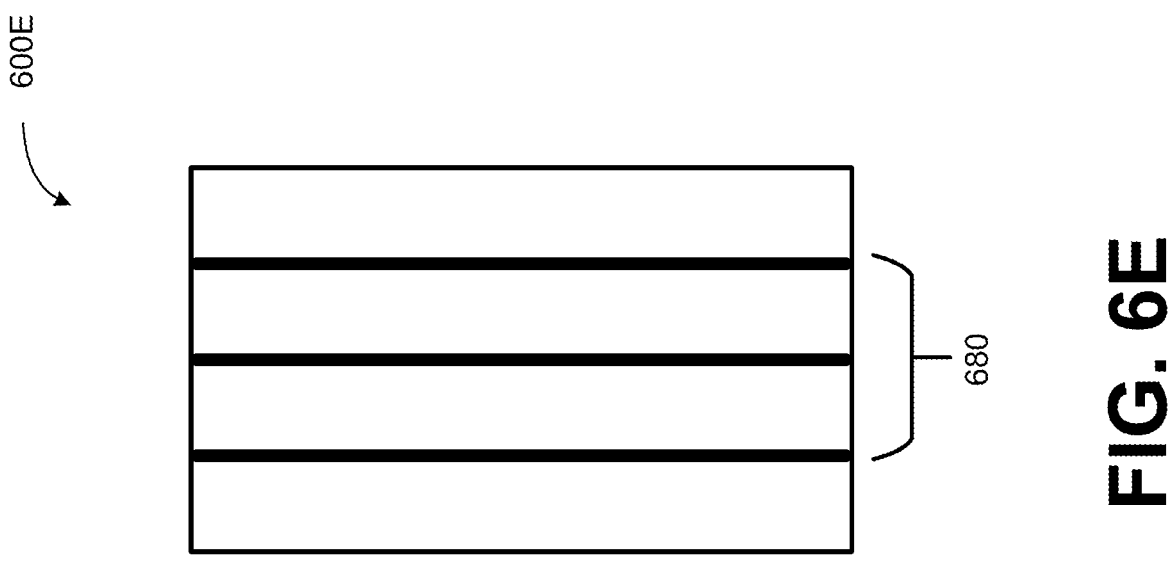
Figure 6D:
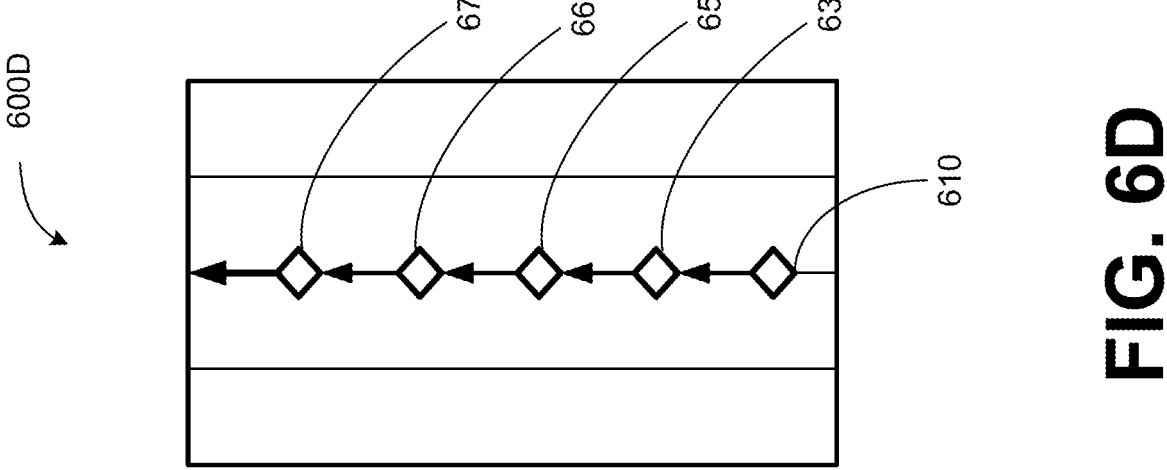

FIGS. 6A-6E are diagrams illustrating an example of polyline extraction during heatmap processing, in accordance with some implementations of the present disclosure. FIG. 6A is a diagram 600A showing polyline 605 and the selection of seed point 610 of polyline 605. Seed point 610 can be selected as a point having a score that satisfies a threshold condition. For example, the score can be a heatmap value, and seed point 610 can be selected if the heatmap value is greater than a threshold heatmap value (e.g., 0.5). FIG. 6B is a diagram 600B showing set of candidate points 620-1 through 620-3 that can be selected as an additional point after the seed point. For example, set of candidate points 620-1 through 620-3 can be located along at least a portion of a circle (e.g. semicircle) having a given radius from seed point 610. FIG. 6C is a diagram 600C showing selection of candidate point 620-1 as additional point 630 of polyline 605. Additionally, diagram 600C further shows set of candidate points 640-1 through 640-3 that can be selected after additional point 630. Similar to set of candidate points 620-1 through 620-3, set of candidate points 640-1 through 640-3 can be located along at least a portion of a circle (e.g. semicircle) having a given radius from additional point 630. FIG. 6D is a diagram 600D showing selection of candidate point 640-2 as additional point 650 of polyline 605, as well as additional points 660 and 670. That is, the process of selecting additional points of polyline 605 can be repeated until extracting the entirety of polyline 605. FIG. 6E is a diagram 600E showing a set of extracted polylines 680.

Referring back to FIG. 2, lane tracking component 230 can perform lane tracking based on the set of polylines. Even with smoothing as described above, lane lines can be unstable across frames. Thus, lane tracking component 230 can perform lane tracking on a per-frame basis. Further details regarding lane tracking component 230 will now be described below with reference to FIGS. 7-11.

Figure 7:
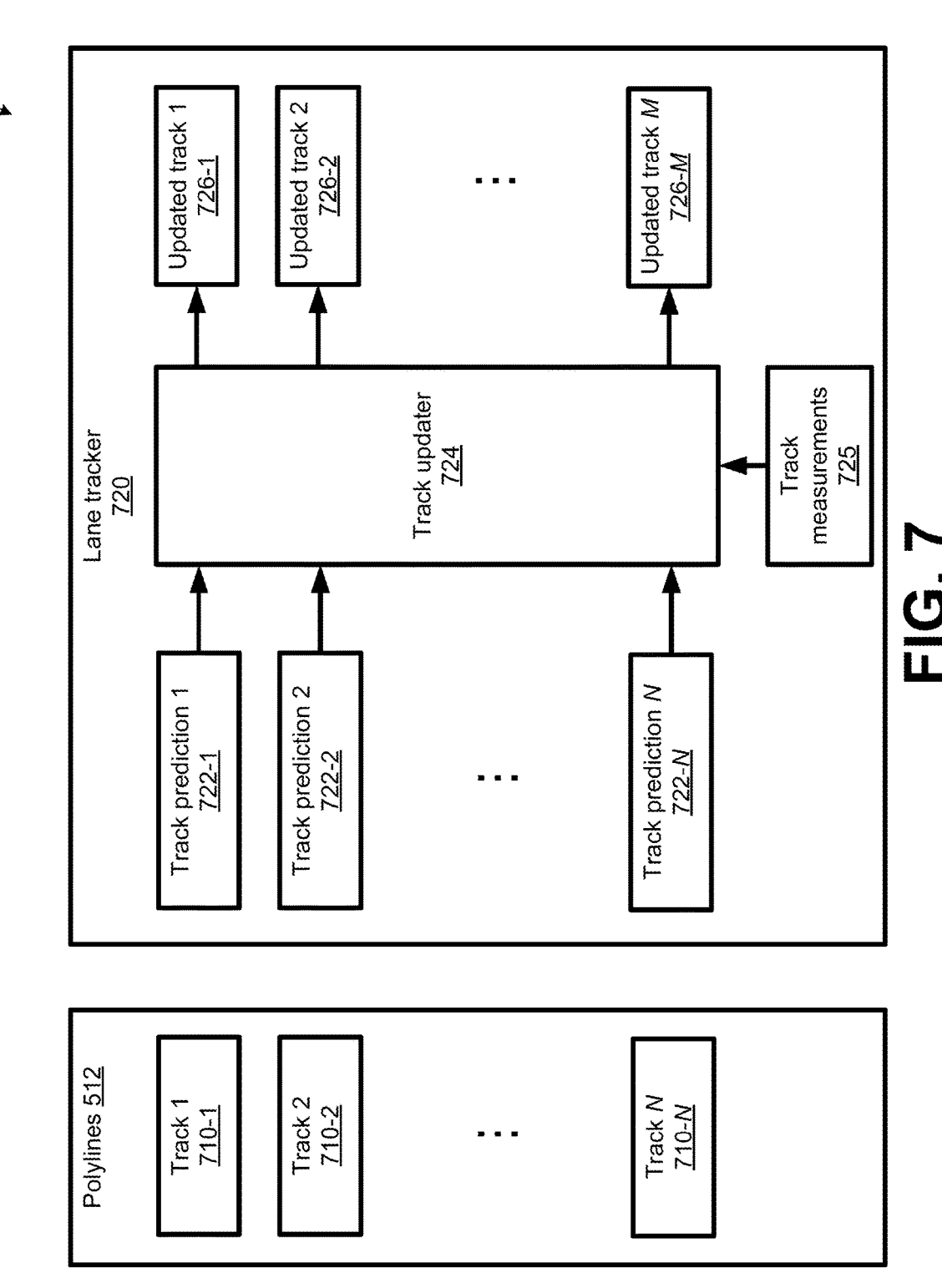
FIG. 7 is a diagram of an example lane tracking system using filter-based lane tracking, in accordance with some implementations of the present disclosure.

FIG. 7 is a diagram of an example lane tracking component 230, in accordance with some implementations of the present disclosure. As shown, lane tracking component 230 can receive set of polylines 512, as described above with reference to FIGS. 2 and 5. Each polyline of set of polylines 512 can define a respective lane track ("track") of a set of tracks of a previous frame at a first time (e.g., t−1). For example, the set of tracks of the previous frame can include track 1 710-1 through track N 710-N. An illustrative example of a set of tracks of a previous frame will be described below with reference to FIG. 8A.

As further shown, lane tracker 720 can be used to perform lane tracking to generate a set of track predictions for a current frame at a second time after the first time, based on the set of tracks of the previous frame. More specifically, lane tracker 720 can generate, for track 1 710-1 through track N 710-N, respective ones of track prediction 1 722-1 through track prediction N 722-N.

In some implementations, a track prediction is an extrapolated track. For example, generating a track prediction for a current frame (e.g., track prediction 1 722-1) can include extrapolating (e.g., linearly extrapolating) a respective track of the previous frame (e.g., track 1 710-1). For example, a set of points of the track of the previous frame can be selected from an end of the track of the previous frame, and a straight line can be fitted to the set of points. A set of predicted points can then be extrapolated from the end of the track of the previous frame in the direction of the straight line uniformly. Illustrative examples of generating a track prediction for a current frame will be described below with reference to FIGS. 8B and 9.

Lane tracking component 230 can further generate set of track measurements 725 of the current frame based on sensor data, and generate a set of updated tracks for the current frame, including updated track 1 726-1 through updated track M 726-M, based on set of track measurements 725. Each track measurement of set of track measurements 725 can have a respective set of measured points.

In some implementations, generating an updated track of the set of updated tracks includes associating (e.g., assigning) a track measurement of the current frame to a track prediction for the current frame, and updating the track prediction based on its associated track measurement to obtain an updated track. More specifically, associating a track measurement of the current frame to a track prediction can include matching the track measurement to the track prediction. It may be the case that at least one track measurement is determined to not have an association with a track prediction (e.g., unmatched). This can happen if the track measurement is indicative of a track that was not present in the previous frame. In such a situation, the track measurement can be determined as an updated track (e.g., new track) of the current frame. In some implementations, associating a track measurement of the current frame to a track prediction for the current frame includes performing a pointwise distance method. More specifically, for each point of a track measurement of the current frame, a set of point-to-track costs can be computed, where each point-totrack cost corresponds to a minimum distance from the point of the track measurement to a respective track prediction for the current frame (i.e., a nearest point of the track prediction). In some implementations, a track measurement of the current frame is associated with a track prediction for the current frame using majority voting based on total point-to-track assignments. For example, a point of a track measurement of the current frame can be assigned to a track prediction for the current frame having a minimum point-to-track cost among the set of point-to-track costs. After assigning each point of the track measurement, for each track prediction for the current frame, the number of points of the track measurement assigned to the track prediction is counted. The track prediction having the highest number of assigned points is selected to be associated with the track measurement. To illustrate, assume that there is a first track prediction, a second track prediction, and a track measurement. If four points of the track measurement are assigned to the first track prediction and only one point of the track measurement is assigned to the second track position, then the first track prediction is selected to be associated with the track measurement. Illustrative examples of associating a track measurement of a current frame to a track prediction for the current frame will be described below with reference to FIGS. 8B and 10.

Updating a track prediction for the current frame based on its associated track measurement can include updating a set of points of the track prediction to obtain a set of updated points, and generating an updated track for the current frame based on the set of updated points. For example, at least some points of the track prediction can be projected onto respective locations on the track measurement to generate a set of projected points. Any points that are not projected onto a respective location on the track measurement are discarded and not used to generate the updated track. For each projected point of the set of projected points, a respective updated point corresponding to the projected point can have a location determined within a boundary defined by the track prediction and the track measurement based on an uncertainty metric.

In some implementations, updating a track prediction for a current frame based on its associated track measurement includes employing a filter. In some implementations, a filter is a Kalman filter. For example, the Kalman filter can be a 1D Kalman filter. More specifically, for each projected point of the set of projected points, a respective updated point corresponding to the projected point can be determined as a function of Kalman gain. Kalman gain controls how much weight is given to the points of the track prediction in updating the track prediction. For example, with a high Kalman gain, the Kalman filter places more weight on the points of the track measurement and with a low Kalman gain, the Kalman filter places more weight on the points of the track prediction. For example a 1D Kalman filter can be determined as:

$$p_t = (1 - K)p_{t-1} + Kp_m \qquad (1)$$

where $p_t$ is an updated point of an updated track, $p_{t-1}$ is a point on a track measurement, $p_m$ is a projected point from the track prediction onto the track measurement, and $K \in [0, 1]$ is the Kalman gain. For each track prediction point, the Kalman gain for the track prediction point can be proportional to a ratio of a first variance of the track prediction point with respect to the previous frame ($var_{t-1}$) and the sum of the first variance and a second variance of the track prediction point with respect to the track measurement ($\text{var}_m$). For example, the Kalman gain can be determined as:

$$K = \frac{\text{var}_{t-1}}{\text{var}_{t-1} + \text{var}_m} \qquad (2)$$

Illustrative examples of generating a set of updated track predictions for a current frame will be described below with reference to FIGS. 8C and 11.

At a third time after the second time, a subsequent frame becomes a new current frame, and the current frame becomes a new previous frame. Thus, the set of updated tracks described above becomes a set of tracks of the new previous frame at the second time, and a set of updated tracks for the new current frame can be generated using a similar process described above. Accordingly, the lane detection and tracking process can recursively update lanes.

Lane tracking component 230 can implement lane tracking management logic. For example, as described above, lane tracking component 230 can create new tracks for track measurements that are left unassociated or unmatched. As another example, lane tracking component 230 can promote a track if the track is associated with a track measurement for a threshold number of consecutive frames. In some implementations, the threshold number of consecutive frames is at least two frames. As yet another example, lane tracking component 230 can demote (e.g., kill) a track if the track has not been associated with a track measurement for a threshold amount of time. In some implementations, the threshold amount of time ranges from about 0.1 second (s) to about 0.5 s. For example, the threshold amount of time can be about 0.25 s. As yet another example, lane tracking component 230 can remove at least one point from a front end of a track in response to the number of points of the track exceeding a threshold number of points. The purpose of this is to balance resource consumption (e.g., processor and/or memory consumption) with a suitable number of points for lane tracking purposes. In some implementations, the threshold number of points ranges from about 100 points to about 300 points. For example, the threshold number of points can be about 190 points. Further details regarding lane tracking component 230 will now be described below with reference to FIGS. 8A-11.

Figure 8A:
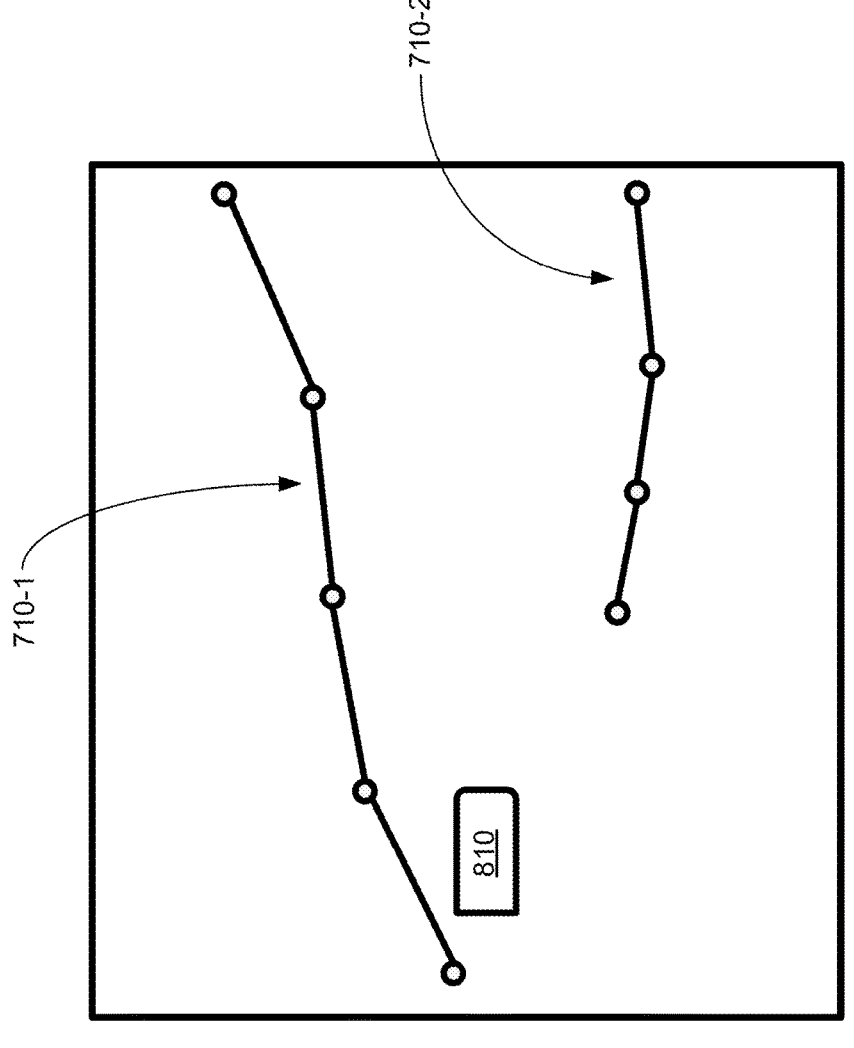
FIGS. 8A-8C are diagrams illustrating an example of filter-based lane tracking, in accordance with some implementations of the present disclosure.
Figure 8B:
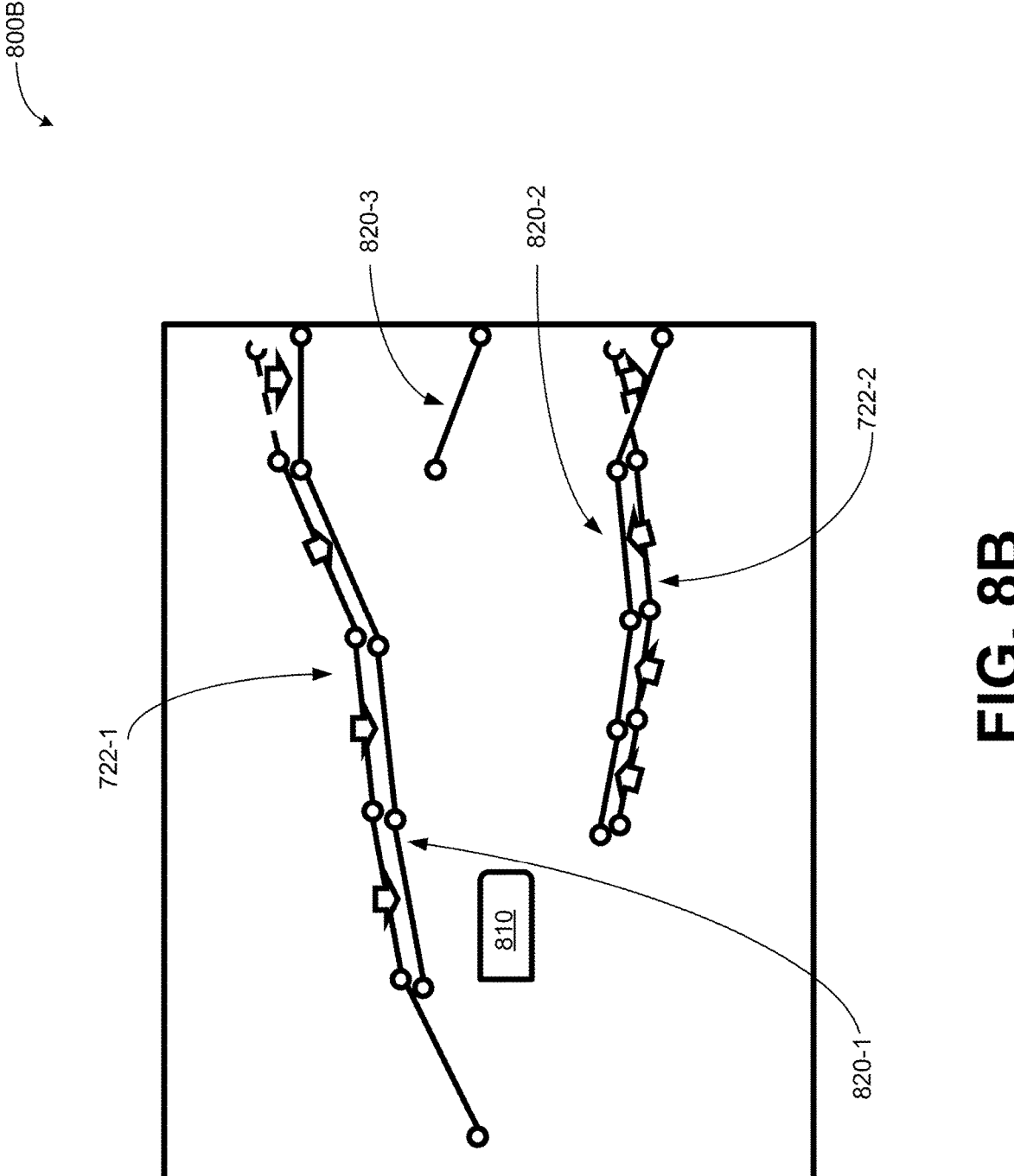
Figure 8C:
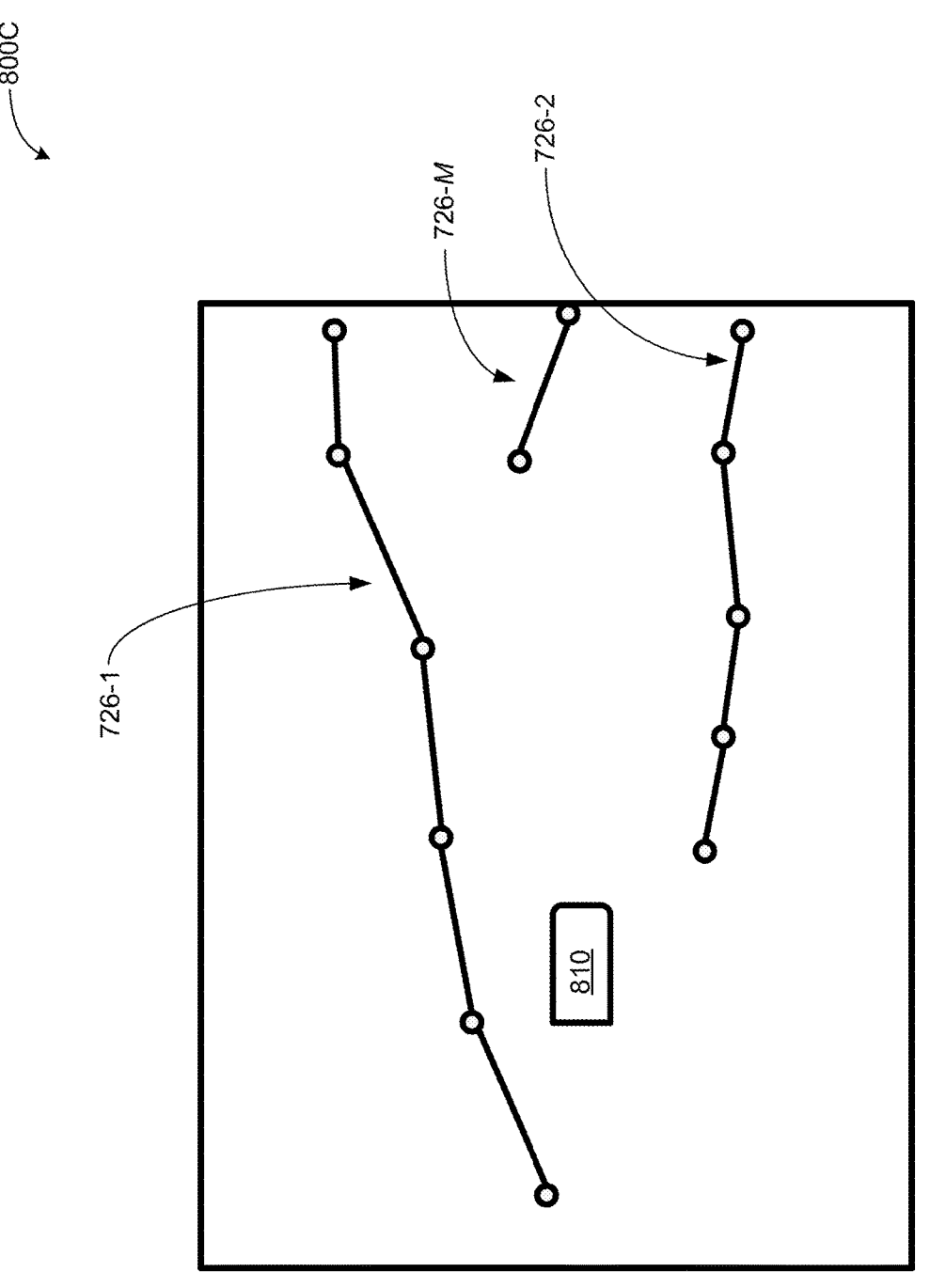

FIGS. 8A-8C are diagrams illustrating an example of lane tracking performed using a set of polylines, in accordance with some implementations of the present disclosure. FIG. 8A is a diagram 800A showing track 1 710-1 and track 2 710-2 and AV 810 during a previous frame at a first time. For example, AV 810 can be similar to AV 100 of FIG. 1.

FIG. 8B is a diagram 800B showing track prediction 722-1, track prediction 722-2 and track measurements 820-1 through 820-3 made by AV 810 during a current frame at a second time after the first time. For example, track measurements 820-1 through 820-3 can be included in set of track measurements 725 of FIG. 7. More specifically, diagram 800B shows the association of track measurement 820-1 to track prediction 722-1, and the association of track measurement 820-2 to track prediction 722-2. In this example, track measurement 820-3 is not associated with any track predictions corresponding to a track of the previous frame (e.g., unmatched track measurement).

FIG. 8C is a diagram 800C showing updated track 726-1, updated track 726-2 and updated track 726-M. More specifically, updated track 726-1 is generated by updating track prediction 722-1 based on its associated track measurement 820-1 (e.g., using a Kalman filter), updated track 726-2 is generated by updating track prediction 722-2 based on its associated track measurement 820-2 (e.g., using a Kalman filter), and updated track 726-M is a new track defined for track measurement 820-3 (since track measurement 820-3 is not associated with any track predictions).

Figures 9, 10, 11:
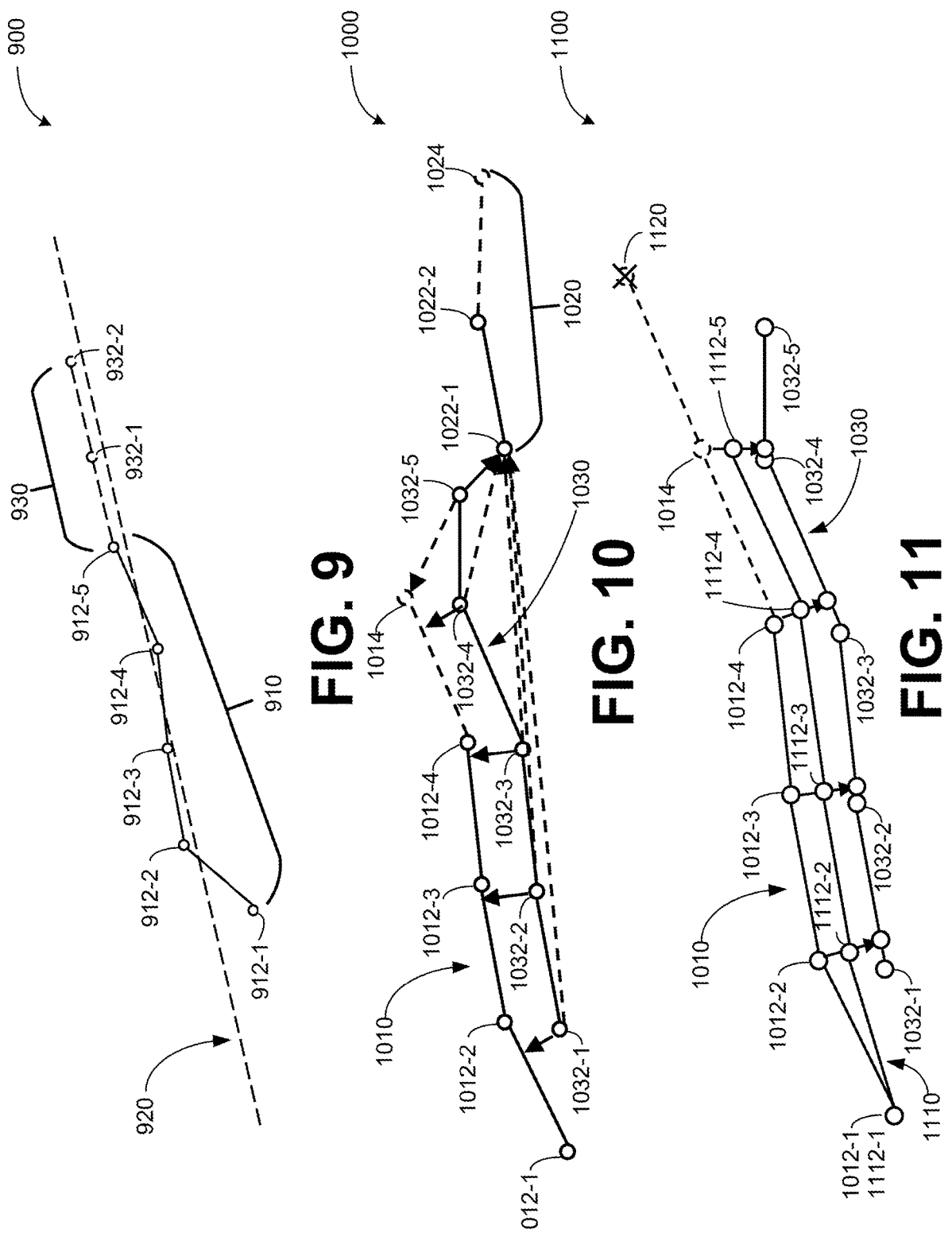
FIG. 9 is a diagram illustrating an example of generating a track prediction for a current frame using polyline extrapolation, in accordance with some implementations of the present disclosure.
FIG. 10 is a diagram illustrating an example of associating a track measurement of a current frame to a track prediction for the current frame, in accordance with some implementations of the present disclosure.
FIG. 11 is a diagram illustrating an example of generating an updated track for a current frame, in accordance with some implementations of the present disclosure.

FIG. 9 is a diagram 900 illustrating an example of generating a track prediction for a current frame using polyline extrapolation, in accordance with some implementations of the present disclosure. As shown, track 910 is a track of a previous frame including points 912-1 through 912-5. As further shown, line 920 is fitted. For example, a set of points among points 912-1 through 912-5 can be selected to fit line 920. In this illustrative example, points 912-2 through 912-5 are used to fit line 920, and point 912-1 is not used. As further shown, track 910 is extended using linear extrapolation based on line 920 to include section 930 including extrapolated points 932-1 and 932-2.

FIG. 10 is a diagram 1000 illustrating an example of associating a track measurement of a current frame to a track prediction for the current frame, in accordance with some implementations of the present disclosure. Diagram 1000 shows track prediction 1010 including points 1012-1 through 1012-4 and extrapolated point 1014, and track prediction 1020 including points 1022-1 and 1022-2 and extrapolated point 1024. Diagram 1000 further shows track measurement 1030 including points 1032-1 through 1032-5. In this example, four points 1032-1 through 1032-4 are assigned to track prediction 1010 as being the lowest cost (e.g., minimum distance) with respect to track prediction 1010 and track prediction 1020, while a single point 1032-5 is assigned to track prediction 1020 as being the lowest cost with respect to track prediction 1010 and track prediction 1020. Thus, track measurement 1030 can be associated with track prediction 1010 by majority voting.

FIG. 11 is a diagram 1100 illustrating an example of generating an updated track for a current frame, in accordance with some implementations of the present disclosure. Diagram 1100 shows track prediction 1010 including points 1012-1 through 1012-4 and extrapolated points 1014 and 1120, and track measurement 1030 including points 1032-1 through 1032-5, after the association shown in FIG. 10. As shown, each of points 1012-1 through 1012-4 and 1014 is projected to track measurement 1030, as indicated by the arrows. Point 1120 is not projected onto track measurement 1030 and is removed from the updating process. Updated track 1110 is generated including updated points 1112-1 through 1112-5 as described above with reference to FIG. 7.

Figure 12A:
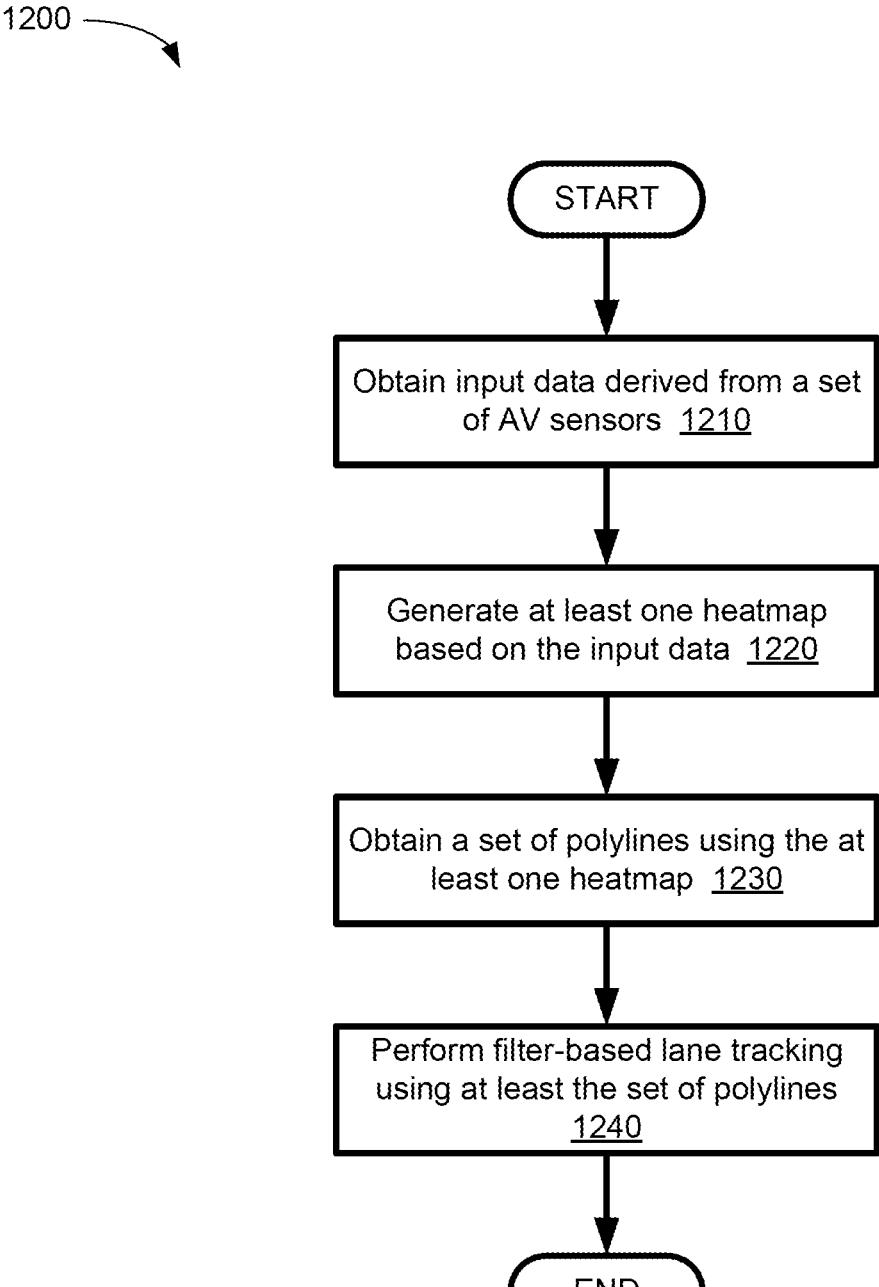
FIG. 12A is a flow diagram of a method to implement autonomous vehicle (AV) lane understanding systems using filter-based lane tracking, in accordance with some implementations of the present disclosure.

FIG. 12A is a flow diagram illustrating an example method 1200 to implement AV lane understanding systems using filter-based lane tracking, in accordance with some implementations of the present disclosure. At least one processing device operatively coupled to memory can perform method 1200 and/or each of their individual functions, routines, subroutines, or operations. For example, one or more processors can be communicably coupled to one or more memory devices. Examples of processors include central processing units (CPUs), graphics processing units (GPUs), tensor processing units (TPUs), application-specific integrated circuits (ASICs), field-programmable gate arrays (FPGAs), etc. A processing device executing method 1200 can perform instructions issued by various components of system 200 of FIG. 2, which may be a part of a perception system of an AV (e.g., perception system 130 of FIG. 1), a vehicle that deploys driver assistance technology, or a part of any other application platform that uses object detection and classification. For example, method 1200 can be used to improve performance of a data processing system and/or an AVCS (e.g., the data processing system 120 and/or the AVCS 140 of FIG. 1).

In some implementations, a single processing thread can perform method 1200. Alternatively, two or more processing threads can perform method 1200, with each thread executing one or more individual functions, routines, subroutines, or operations of method 1200. In an illustrative example, the processing threads implementing method 1200 can be synchronized (e.g., using semaphores, critical sections, and/or other thread synchronization mechanisms). Alternatively, the processing threads implementing method 1200 can be executed asynchronously with respect to each other. Various operations of method 1200 can be performed in a different order compared with the order shown in FIG. 12A. Some operations of method 1200 can be performed concurrently with other operations. Some operations can be optional.

At operation 1210, processing logic obtains input data derived from a set of AV sensors. Further details regarding obtaining the input data are described above with reference to FIGS. 2-3B.

At operation 1220, processing logic generates at least one heatmap based on the input data. In some embodiments, generating the at least one heatmap includes processing a set of BEV features derived from sensor data. In some embodiments, the set of BEV features includes a fused BEV feature generated by fusing at least two BEV features extracted from respective sensor data. For example, a fused BEV feature can be generated by fusing at least a camera BEV feature extracted from camera data and a radar BEV feature extracted from radar data. Processing the set of BEV features can include implementing a set of lane detection classifier heads. Further details regarding generating at least one heatmap based on input data are described above with reference to FIGS. 2 and 4-5D.

At operation 1230, processing logic obtains a set of polylines using the at least one heatmap. In some embodiments, obtaining the set of polylines includes extracting the set of polylines from the at least one heatmap. In some embodiments, obtaining the set of polylines includes generating the set of polylines using the at least one heatmap. For example, generating the set of polylines can include using a generative model to predict the set of polylines based on the at least one heatmap. Further details regarding generating a set of polylines using the at least one heatmap are described above with reference to FIGS. 2 and 4-6E.

At operation 1240, processing logic performs filter-based lane tracking using at least the set of polylines. In some implementations, performing filter-based lane tracking includes using a Kalman filter. For example, the Kalman filter can be a 1D Kalman filter. Further details regarding performing filter-based lane tracking using at least the set of polylines are described above with reference to FIGS. 2 and 7-11 and will now be described below with reference to FIG. 12B.

Figure 12B:
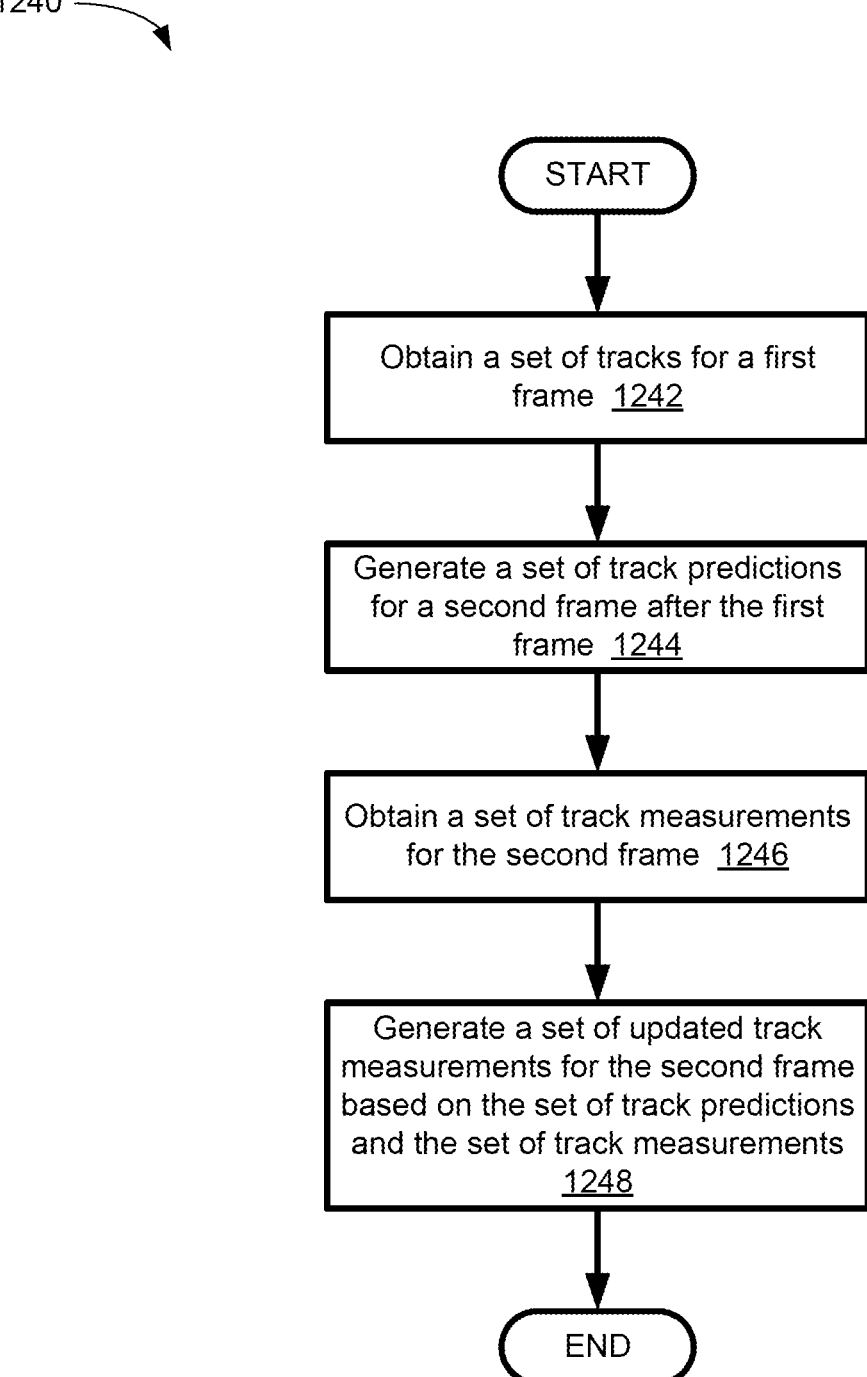
FIG. 12B is a flow diagram of a method to perform filter-based lane tracking using a set of polylines and a filter, in accordance with some implementations of the present disclosure.

FIG. 12B is a flow diagram illustrating an example method 1240 to perform filter-based lane tracking using a set of polylines and a filter, in accordance with some implementations of the present disclosure. At least one processing device operatively coupled to memory can perform method 1240 and/or each of their individual functions, routines, subroutines, or operations. For example, one or more processors can be communicably coupled to one or more memory devices. Examples of processors include central processing units (CPUs), graphics processing units (GPUs), tensor processing units (TPUs), application-specific integrated circuits (ASICs), field-programmable gate arrays (FPGAs), etc. A processing device executing method 1240 can perform instructions issued by various components of system 200 of FIG. 2, which may be a part of a perception system of an AV (e.g., perception system 130 of FIG. 1), a vehicle that deploys driver assistance technology, or a part of any other application platform that uses object detection and classification. For example, method 1240 can be used to improve performance of a data processing system and/or an AVCS (e.g., the data processing system 120 and/or the AVCS 140 of FIG. 1).

In some implementations, a single processing thread can perform method 1240. Alternatively, two or more processing threads can perform method 1240, with each thread executing one or more individual functions, routines, subroutines, or operations of method 1230. In an illustrative example, the processing threads implementing method 1240 can be synchronized (e.g., using semaphores, critical sections, and/or other thread synchronization mechanisms). Alternatively, the processing threads implementing method 1240 can be executed asynchronously with respect to each other. Various operations of method 1240 can be performed in a different order compared with the order shown in FIG. 12B. Some operations of method 1240 can be performed concurrently with other operations. Some operations can be optional.

At operation 1242, processing logic obtains a set of tracks for a first frame. For example, the first frame can be a previous frame corresponding to a first time. At operation 1244, processing logic generates a set of track predictions for a second frame after the first frame. For example, the second frame can be a current frame corresponding to a second time after the first time. More specifically, each track prediction of the set of track predictions can be an extrapolated track generated by extrapolating (e.g., linearly extrapolating) a respective track of the set of tracks for the first frame. At operation 1246, processing logic obtains a set of track measurements for the second frame and, at operation 1248, processing logic generates a set of updated track measurements for the second frame based on the set of track predictions and the set of track measurements. Further details regarding operations 1242-1248 are described above with reference to FIGS. 2 and 7-12A.

FIG. 13 depicts a block diagram of an example computing device 1300, in accordance with some implementations of the present disclosure. Example computing device 1300 can be connected to other computing devices in a LAN, an intranet, an extranet, and/or the Internet. Computing device 1300 can operate in the capacity of a server in a client-server network environment. Computing device 1300 can be a personal computer (PC), a set-top box (STB), a server, a network router, switch or bridge, or any device capable of executing a set of instructions (sequential or otherwise) that specify actions to be taken by that device. Further, while only a single example computing device is illustrated, the term "computer" shall also be taken to include any collection of computers that individually or jointly execute a set (or multiple sets) of instructions to perform any one or more of the methods discussed herein.

Example computing device 1300 can include a processing device 1302 (also referred to as a processor or CPU), a main memory 1304 (e.g., read-only memory (ROM), flash memory, dynamic random access memory (DRAM) such as synchronous DRAM (SDRAM), etc.), a static memory 1306 (e.g., flash memory, static random access memory (SRAM), etc.), and a secondary memory (e.g., a data storage device 1318), which can communicate with each other via a bus 1330.

Processing device 1302 (which can include processing logic 1303) represents one or more general-purpose processing devices such as a microprocessor, central processing unit, or the like. More particularly, processing device 1302 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1302 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1302 can be configured to execute instructions performing method 1200 of FIG. 12A.

Example computing device 1300 can further comprise a network interface device 1308, which can be communicatively coupled to a network 1320. Example computing device 1300 can further comprise a video display 1310 (e.g., a liquid crystal display (LCD), a touch screen, or a cathode ray tube (CRT)), an alphanumeric input device 1312 (e.g., a keyboard), a cursor control device 1314 (e.g., a mouse), and an acoustic signal generation device 1316 (e.g., a speaker).

Data storage device 1318 can include a computer-readable storage medium (or, more specifically, a non-transitory computer-readable storage medium) 1328 on which is stored one or more sets of executable instructions 1322. In accordance with one or more aspects of the present disclosure, executable instructions 1322 can comprise executable instructions performing method 1200 of FIG. 12A.

Executable instructions 1322 can also reside, completely or at least partially, within main memory 1304 and/or within processing device 1302 during execution thereof by example computing device 1300, main memory 1304 and processing device 1302 also constituting computer-readable storage media. Executable instructions 1322 can further be transmitted or received over a network via network interface device 1308.

While the computer-readable storage medium 1328 is shown in FIG. 13 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "obtaining," "generating," "providing," "causing," "transforming," "fusing," "selecting," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:

obtaining, by a processing device, input data derived from a set of sensors of an autonomous vehicle (AV);

generating, by the processing device, at least one heatmap in a bird's eye view (BEV) representation by applying a set of lane detection classifier heads to a fused BEV feature generated from the input data;

obtaining, by the processing device, a set of polylines in the BEV representation using the at least one heatmap, wherein each polyline of the set of polylines corresponds to a respective track of a first set of tracks for a first frame; and generating, by the processing device, a second set of tracks for a second frame after the first frame by using a statistical filter based on a set of extrapolated tracks for the second frame and a set of track measurements for the second frame, wherein each track measurement of the set of track measurements corresponds to a respective updated polyline obtained for the second frame.

2. The method of claim 1, wherein generating the second set of tracks further comprises:

extrapolating each track of the first set of tracks to generate the set of extrapolated tracks for the second frame; and obtaining the set of track measurements for the second frame.

3. The method of claim 1, wherein generating the second set of tracks further comprises:

associating a track measurement of the set of track measurements to an extrapolated track of the set of extrapolated tracks, wherein the track measurement comprises a set of measured points;

projecting a set of points of the extrapolated track to the track measurement to obtain a set of projected points of the track measurement; and generating an updated set of points for a track of the second set of tracks based on the set of projected points and the set of measured points.

4. The method of claim 1, wherein generating the second set of tracks further comprises creating a new track for a track measurement that is not associated with an extrapolated track of the set of extrapolated tracks.

5. The method of claim 1, wherein the input data comprises camera data obtained from at least one camera of the AV and radar data obtained from at least one radar of the AV.

6. The method of claim 1, wherein obtaining the input data further comprises generating a dataset with lane labels using auto-labeling.

7. The method of claim 1, wherein obtaining the set of polylines further comprises one of:

extracting the set of polylines from the at least one heatmap; or generating, using a generative model, the set of polylines using the at least one heatmap.

8. A system comprising:

a memory; and a processing device communicatively coupled to the memory, the processing device configured to:

obtain input data derived from a set of sensors of an autonomous vehicle (AV);

generate at least one heatmap in a bird's eye view (BEV) representation by applying a set of lane detection classifier heads to a fused BEV feature generated from the input data;

obtain a set of polylines in the BEV representation using the at least one heatmap, wherein each polyline of the set of polylines corresponds to a respective track of a first set of tracks for a first frame; and generate a second set of tracks for a second frame after the first frame by using a statistical filter based on a set of extrapolated tracks for the second frame and a set of track measurements for the second frame, wherein each track measurement of the set of track measurements corresponds to a respective updated polyline obtained for the second frame.

9. The system of claim 8, wherein, to generate the second set of tracks, the processing device is further configured to:

extrapolate each track of the first set of tracks to generate the set of extrapolated tracks for the second frame; and obtain the set of track measurements for the second frame.

10. The system of claim 8, wherein, to generate the second set of tracks, the processing device is further configured to:

associate a track measurement of the set of track measurements to an extrapolated track of the set of extrapolated tracks, wherein the track measurement comprises a set of measured points;

project a set of points of the extrapolated track to the track measurement to obtain a set of projected points of the track measurement; and generate an updated set of points for a track of the second set of tracks based on the set of projected points and the set of measured points.

11. The system of claim 8, wherein, to generate the set of updated track measurements for the second frame, the processing device is further configured to create a new track for a track measurement that is not associated with an extrapolated track of the set of extrapolated tracks.

12. The system of claim 8, wherein the input data comprises camera data obtained from at least one camera of the AV and radar data obtained from at least one radar of the AV.

13. The system of claim 8, wherein, to obtain the input data, the processing device is further configured to generate a dataset with lane labels using auto-labeling.

14. The system of claim 8, wherein, to obtain the set of polylines, the processing device is further configured to:

extract the set of polylines from the at least one heatmap; or generate, using a generative model, the set of polylines using the at least one heatmap.

15. A non-transitory computer-readable storage medium having instructions stored thereon that, when executed by a processing device, cause the processing device to perform operations comprising:

obtaining input data derived from a set of sensors of an autonomous vehicle (AV);

generating at least one heatmap in a bird's eye view (BEV) representation by applying a set of lane detection classifier heads to a fused BEV feature generated from the input data;

obtaining a set of polylines in the BEV representation using the at least one heatmap, wherein each polyline of the set of polylines corresponds to a respective track of a first set of tracks for a first frame; and generating a second set of tracks for a second frame after the first frame by using a statistical filter based on a set of extrapolated tracks for the second frame and a set of track measurements for the second frame, wherein each track measurement of the set of track measurements corresponds to a respective updated polyline obtained for the second frame.

16. The non-transitory computer-readable storage medium of claim 15, wherein the operations further comprise:

extrapolating each track of the first set of tracks to generate the set of extrapolated tracks for the second frame; and obtaining the set of track measurements for the second frame.

17. The non-transitory computer-readable storage medium of claim 15, wherein generating the second set of tracks further comprises:

associating a track measurement of the set of track measurements to an extrapolated track of the set of extrapolated tracks, wherein the track measurement comprises a set of measured points;

projecting a set of points of the extrapolated track to the track measurement to obtain a set of projected points of the track measurement; and generating an updated set of points for a track of the second set of tracks based on the set of projected points and the set of measured points.

18. The non-transitory computer-readable storage medium of claim 15, wherein generating the second set of tracks further comprises creating a new track for a track measurement that is not associated with an extrapolated track of the set of extrapolated tracks.

19. The non-transitory computer-readable storage medium of claim 15, wherein the input data comprises camera data obtained from at least one camera of the AV and radar data obtained from at least one radar of the AV, and wherein obtaining the input data further comprises generating a dataset with lane labels using auto-labeling.

20. The non-transitory computer-readable storage medium of claim 15, wherein obtaining the set of polylines further comprises one of:

extracting the set of polylines from the at least one heatmap; or generating, using a generative model, the set of polylines using the at least one heatmap.

\* \* \* \* \*